(12) United States Patent
Chu et al.

(10) Patent No.: US 10,698,276 B2
(45) Date of Patent: Jun. 30, 2020

(54) DISPLAY DEVICE AND METHOD FOR FABRICATING THE SAME

(71) Applicant: SAMSUNG DISPLAY CO., LTD., Yongin-si, Gyeonggi-Do (KR)

(72) Inventors: Seungjin Chu, Seoul (KR); Youngmin Kim, Asan-si (KR); Seungjin Baek, Suwon-si (KR); Haeil Park, Seoul (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 224 days.

(21) Appl. No.: 15/475,969

(22) Filed: Mar. 31, 2017

(65) Prior Publication Data
US 2017/0351149 A1    Dec. 7, 2017

(30) Foreign Application Priority Data

Jun. 3, 2016 (KR) .................. 10-2016-0069608

(51) Int. Cl.
*G02F 1/1362* (2006.01)
*G02F 1/1335* (2006.01)
*G02F 1/13357* (2006.01)

(52) U.S. Cl.
CPC .. *G02F 1/136227* (2013.01); *G02F 1/133528* (2013.01); *G02F 1/133617* (2013.01);
(Continued)

(58) Field of Classification Search
CPC ........ G02F 1/134309; G02F 1/133528; G02F 1/136227; G02F 1/1368; G02F 1/133514; G02F 2001/133565; G02F 2001/133548; G02F 1/133617; G02F 2001/133614; G02F 2001/136222
See application file for complete search history.

(56) References Cited

U.S. PATENT DOCUMENTS 8,648,361 B2   2/2014   Lee et al.
8,687,150 B2   4/2014   Park et al.
(Continued)

FOREIGN PATENT DOCUMENTS

KR   10-2011-0018785   2/2011
KR   10-2011-0061899   6/2011
KR   10-2013-0105770   9/2013

OTHER PUBLICATIONS

European Search Report dated Nov. 3, 2017 in corresponding European Appln. No. 17174354.5 (9 pages).
(Continued)

*Primary Examiner* — Phu Vu
(74) *Attorney, Agent, or Firm* — F. Chau & Associates, LLC

(57) ABSTRACT

A display device and a method of manufacturing the display device are capable of enhancing arrangement condition of a switching element, a color conversion layer, and a pixel electrode, and increasing an aperture ratio of a pixel. The display device includes: a first substrate; a switching element and a color conversion layer on the first substrate; a polarization pattern overlapping the color conversion layer and connected to the switching element; and a pixel electrode overlapping the polarization pattern and connected to the polarization pattern.

28 Claims, 15 Drawing Sheets

(52) U.S. Cl.
CPC ............ *G02F 2001/133548* (2013.01); *G02F 2001/133565* (2013.01); *G02F 2001/133614* (2013.01); *G02F 2001/136222* (2013.01)

(56) References Cited

U.S. PATENT DOCUMENTS

| | | | | |
|---|---|---|---|---|
| 9,405,151 | B2 | 8/2016 | Park et al. | |
| 2001/0050743 | A1* | 12/2001 | Ko | G02F 1/136286 349/139 |
| 2012/0127404 | A1* | 5/2012 | Takada | G02F 1/133528 349/96 |
| 2012/0194746 | A1* | 8/2012 | Hall | H04N 9/72 348/691 |
| 2012/0194764 | A1 | 8/2012 | Ishizumi | |
| 2012/0206678 | A1 | 8/2012 | Kim et al. | |
| 2015/0022766 | A1 | 1/2015 | Kim et al. | |
| 2015/0261048 | A1 | 9/2015 | Chae et al. | |
| 2016/0062183 | A1 | 3/2016 | Sung et al. | |
| 2016/0161798 | A1* | 6/2016 | Lee | G02F 1/133528 349/65 |
| 2016/0306210 | A1* | 10/2016 | Oh | G02F 1/13394 |
| 2016/0363812 | A1* | 12/2016 | Li | G02F 1/133514 |
| 2017/0363915 | A1* | 12/2017 | Song | G02F 1/133512 |

OTHER PUBLICATIONS

Communication from the European Patent Office dated Sep. 24, 2019 in corresponding European Patent Application No. 17174354.5 (4 pages).

\* cited by examiner

DISPLAY DEVICE AND METHOD FOR FABRICATING THE SAME

CROSS-REFERENCE TO RELATED APPLICATION

This application claims priority under 35 U.S.C. § 119 to Korean Patent Application No. 10-2016-0069608, filed on Jun. 3, 2016, in the Korean Intellectual Property Office (KIPO), the disclosure of which is incorporated by reference herein in its entirety.

TECHNICAL FIELD

Exemplary embodiments of the present invention relate to a display device and a method of manufacturing the same, and more particularly, to a display device capable of enhancing arrangement condition of a switching element, a color conversion layer, and a pixel electrode and increasing an aperture ratio of a pixel, and a method of manufacturing the same.

DISCUSSION OF RELATED ART

A liquid crystal display (LCD) device is a type of a flat panel display (FPD), which has found wide applications recently. The LCD device includes two substrates respectively including two electrodes formed thereon and a liquid crystal layer interposed therebetween. Upon applying a voltage to the two electrodes, liquid crystal molecules of the liquid crystal layer are rearranged such that an amount of transmitted light may be adjusted in the LCD device. The LCD device includes a plurality of pixels, and an aperture ratio of a pixel is generally related to a ratio between the transparent area of the pixel and the whole pixel area. As the transparent area ratio gets larger, light penetrates more efficiently. Thus, the aperture ratio of the pixel may directly affect the utilization of backlight and may determine the panel brightness of the LCD device.

SUMMARY

Exemplary embodiments of the present invention may be directed to a display device capable of enhancing arrangement condition of a switching element, a color conversion layer, and a pixel electrode and increasing an aperture ratio of a pixel, and to a method of manufacturing the display device.

According to an exemplary embodiment of the present invention, a display device includes: a first substrate; a switching element and a color conversion layer on the first substrate; a polarization pattern overlapping the color conversion layer and connected to the switching element; and a pixel electrode overlapping the polarization pattern and connected to the polarization pattern.

The display device may further include a color filter between the color conversion layer and the first substrate.

The display device may further include a capping layer on the switching element and on at least one of the color filter and the color conversion layer.

The display device may further include a planarization layer on the switching element and the color conversion layer.

The planarization layer may be defined with: a first contact hole defined corresponding to a connecting portion between the switching element and the polarization pattern; and a groove defined between the polarization pattern and another polarization pattern.

A depth of the first contact hole may be greater than a depth of the groove.

The display device may further include a passivation layer between the polarization pattern and the pixel electrode.

The passivation layer may be defined with: a second contact hole defined corresponding to the polarization pattern; and a hole defined corresponding to the groove.

The polarization pattern may be connected to the switching element through the first contact hole, and the pixel electrode may be connected to the polarization pattern through the second contact hole.

The polarization pattern may include a plurality of polarization lines spaced apart from each other.

An air layer may be disposed between adjacent ones of the polarization lines.

At least one of the plurality of polarization lines may be connected to the switching element.

The display device may further include a second substrate, and a liquid crystal layer between the first substrate and the second substrate.

The switching element, the color conversion layer, the polarization pattern, and the pixel electrode may be disposed between the first substrate and the liquid crystal layer.

The display device may further include a polarization plate having a transmission axis that has a direction different from a direction of a transmission axis of the polarization pattern.

The second substrate may be disposed between the liquid crystal layer and the polarization plate.

The display device may further include a light blocking layer overlapping the switching element.

The display device may further include a column spacer on the light blocking layer.

The light blocking layer and the column spacer may be unitary.

According to an exemplary embodiment of the present invention, a method of manufacturing a display device includes: forming a switching element on a first substrate; forming a color conversion layer on the first substrate; forming a planarization layer on the switching element and the color conversion layer; defining a first contact hole on the planarization layer, the first contact hole exposing a drain electrode of the switching element; forming a polarization pattern on the planarization layer, the polarization pattern connected to the drain electrode of the switching element through the first contact hole; forming a passivation layer on the polarization pattern; forming a first photoresist pattern and a second photoresist pattern on the passivation layer, the second photoresist pattern having a thickness smaller than a thickness of the first photoresist pattern; removing, through a dry-etching method, a first portion of the passivation layer exposed by the first photoresist pattern and the second photoresist pattern to expose a first portion of the polarization pattern; removing the second photoresist pattern to expose a second portion of the passivation layer and keeping a portion of the first photoresist pattern to form a residual photoresist pattern; removing, through a wet-etching method, the first portion of the polarization pattern exposed by the residual photoresist pattern to expose a first portion of the planarization layer; removing, through a dry-etching method, the second portion of the passiavtion layer exposed by the residual photoresist pattern to expose a second portion of the polarization pattern; removing the residual photoresist pattern; and forming a pixel electrode on the passivation layer, the pixel electrode connected to the second portion of the polarization pattern.

A groove may be further defined in the first portion of the planarization layer, through dry-etching in the removing of second portion of the passivation layer to expose the second portion of the polarization pattern.

The method may further include forming a color filter between the color conversion layer and the first substrate.

The method may further include forming a capping layer on the switching element and on at least one of the color filter and the color conversion layer.

The method may further include forming a common electrode on one surface of a second substrate, and forming a liquid crystal layer between the first substrate and the second substrate.

The method may further include forming a polarization plate on another surface of the second substrate, the polarization plate having a transmission axis that has a direction different from a direction of a transmission axis of the polarization pattern; and disposing a backlight unit below the second substrate to face the polarization plate.

According to an exemplary embodiment of the present invention, a display device includes: a first substrate; a liquid crystal layer disposed between the first substrate and a second substrate; a switching element, a color conversion layer, a polarization pattern, and a pixel electrode disposed on the first substrate and interposed between the first substrate and the liquid crystal layer; and a common electrode disposed on the second substrate and interposed between the liquid crystal layer and the second substrate.

The polarization pattern may overlap the color conversion layer and may be connected to the switching element through a first contact hole, and the pixel electrode may overlap the polarization pattern and may be connected to the polarization pattern through a second contact hole.

The pixel electrode may extend to overlap a data line.

The display device may further include a color filter disposed between the color conversion layer and the first substrate.

BRIEF DESCRIPTION OF THE DRAWINGS

A more complete appreciation of the present invention will become more apparent by describing in detail exemplary embodiments thereof with reference to the accompanying drawings, in which.

Figure 1:
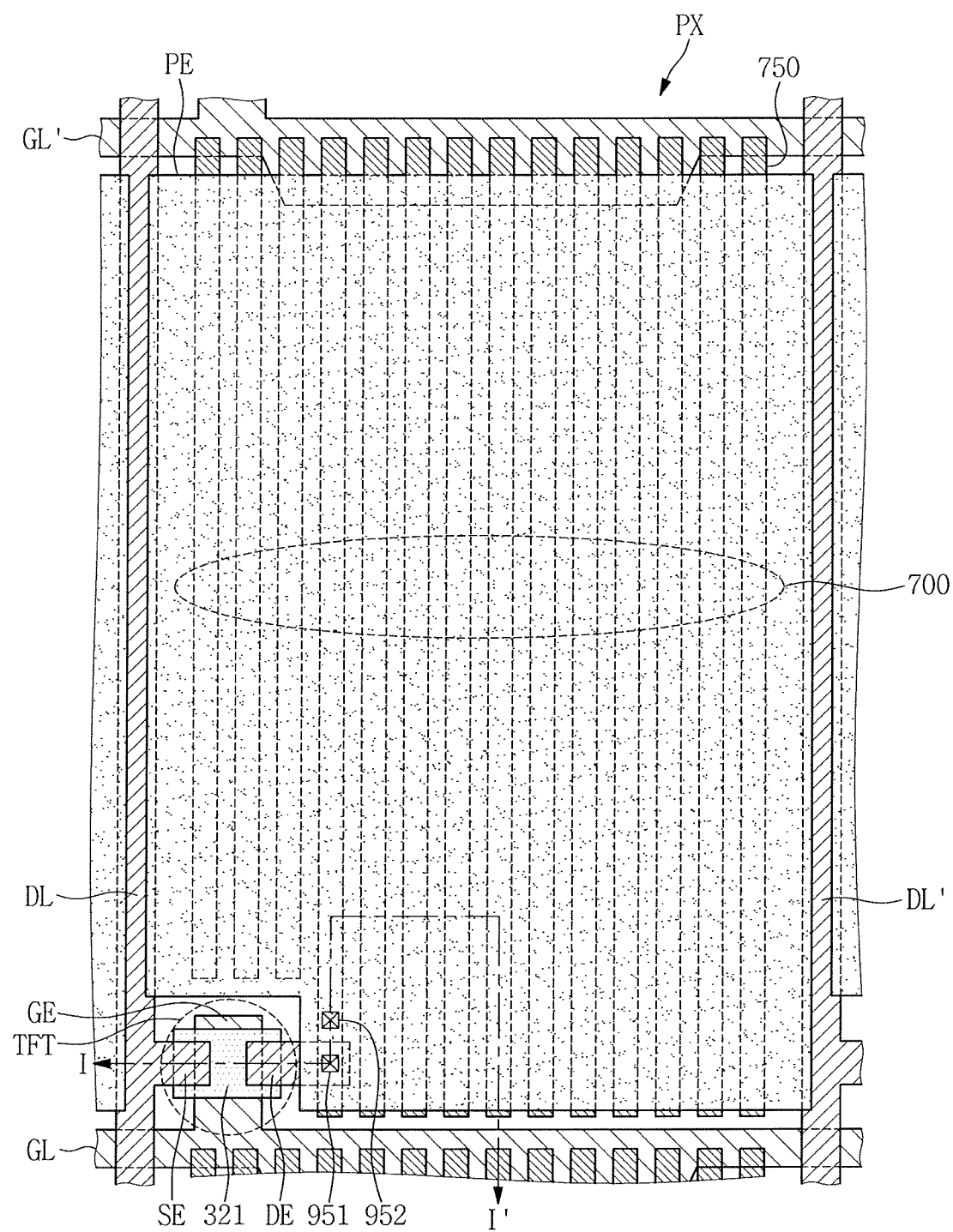
FIG. 1 is a plan view illustrating a display device according to an exemplary embodiment of the present invention.

Since the drawings in FIGS. 1-7 are intended for illustrative purposes, the elements in the drawings are not necessarily drawn to scale. For example, some of the elements may be enlarged or exaggerated for clarity purpose. In addition, many elements present in an actual product may also be omitted.

DETAILED DESCRIPTION OF THE EMBODIMENTS

Features of the invention and methods for achieving them will be made clear from exemplary embodiments of the present invention described below in detail with reference to the accompanying drawings. The invention may, however, be embodied in many different forms and should not be construed as being limited to the specific exemplary embodiments set forth herein. Rather, these exemplary embodiments are provided so that this disclosure will be thorough and complete, and will fully convey the scope of the invention to those skilled in the art. The invention is merely defined by the scope of the claims. Therefore, well-known constituent elements, operations and techniques are not described in detail in the exemplary embodiments of the present invention in order to prevent the invention from being obscurely interpreted. Like reference numerals refer to like elements throughout the specification.

When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be absent therebetween.

The spatially relative terms "below", "beneath", "less", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be now placed "above" another device. Accordingly, the illustrative term "below" may include both at the lower and upper positions. The device may also be oriented in other directions, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises", "comprising", "includes" and/or "including", when used in this specification, specify the presence of stated features, integers, steps, operations, elements, components, and/or groups, but do not preclude the presence or addition of one or more other features, integers, steps, operations, elements, components, and/or groups thereof.

It will be understood that, although the terms "first", "second", "third", and the like may be used herein to describe various elements, these elements should not be limited by these terms. These terms are only used to distinguish one element from another element. Thus, "a first element" discussed below could be termed "a second element" or "a third element", and "a second element" and "a third element" can be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Hereinafter, exemplary embodiments of a display device and a method of manufacturing the display device will be described in detail with reference to FIGS. 1 to 7.

Figure 2:
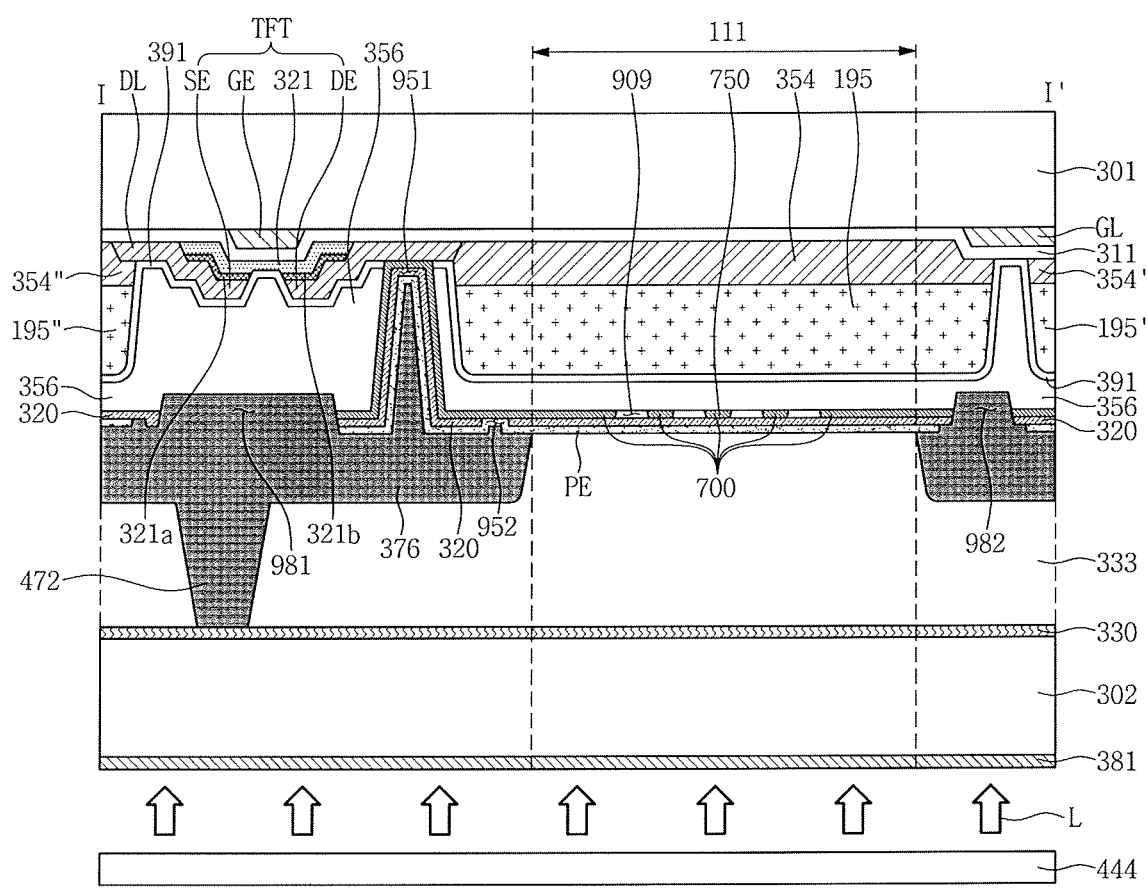
FIG. 2 is a cross-sectional view taken along line I-I' of FIG. 1.

FIG. 1 is a plan view illustrating a display device according to an exemplary embodiment of the present invention, and FIG. 2 is a cross-sectional view taken along line I-I' of FIG. 1.

As illustrated in FIGS. 1 and 2, in an exemplary embodiment of the present invention, a display device includes a plurality of pixels PX and a backlight unit 444.

As illustrated in FIGS. 1 and 2, the pixel PX includes an upper substrate 301 (hereinafter, a first substrate), a switching element TFT, a gate insulating layer 311, a color filter 354, a color conversion layer 195, a passivation layer 320, a capping layer 391, a planarization layer 356, a polarization pattern 700, a passivation layer 320, a pixel electrode PE, a light blocking layer 376, a lower substrate 302 (hereinafter, a second substrate), a common electrode 330, a polarization plate 381, and a liquid crystal layer 333.

In a case where a surface of the first substrate 301 and a surface of the second substrate 302 that face each other are defined as inner surfaces of the corresponding substrates, respectively, and surfaces opposite to the inner surfaces are defined as outer surfaces of the corresponding substrates, respectively, the aforementioned polarization plate 381 may be disposed on the outer surface of the second substrate 302. The polarization plate 381 may have a transmission axis that has a direction different from a direction of a transmission axis of the polarization pattern 700. For example, the transmission axis of the polarization pattern 700 is perpendicular to the transmission axis of the polarization plate 381, and one of the transmission axes thereof is oriented parallel to the data line DL.

The second substrate 302 is disposed between the first substrate 301 and the backlight unit 444. In other words, in an exemplary embodiment of the present invention, the backlight unit 444 may be disposed to face the outer surface of the second substrate 302. In such an exemplary embodiment, the aforementioned polarization plate 381 is disposed between the second substrate 302 and the backlight unit 444.

In an exemplary embodiment of the present invention, the backlight unit 444 may be disposed to face the outer surface of the first substrate 301. In such an exemplary embodiment, the first substrate 310 is disposed between the backlight unit 444 and the second substrate 302.

The pixel PX is connected to the gate line GL and the data line DL. For example, the pixel PX is connected to the gate line GL and the data line DL through the switching element TFT.

The switching element TFT includes a semiconductor layer 321, a gate electrode GE, a source electrode SE, and a drain electrode DE. The gate electrode GE is connected to the gate line GL, the source electrode SE is connected to the data line DL, and the drain electrode DE is connected to the polarization pattern 700. The switching element TFT may be a thin film transistor ("TFT").

The gate electrode GE and the gate line GL are disposed on the first substrate 301.

As illustrated in FIG. 1, the gate electrode GE may have a shape protruding toward the pixel electrode PE from the gate line GL. The gate electrode GE and the gate line GL may be unitary.

The gate electrode GE may include or be formed of, for example, aluminum (Al) or alloys thereof, silver (Ag) or alloys thereof, copper (Cu) or alloys thereof, molybdenum (Mo) or alloys thereof, or combinations thereof. In an exemplary embodiment of the present invention, the gate electrode GE may include or be formed of, for example, one of chromium (Cr), tantalum (Ta), and titanium (Ti). In an exemplary embodiment of the present invention, the gate electrode GE may have a multilayer structure including at least two conductive layers that have different physical properties from one another.

An end portion of the gate line GL may be connected to another layer or an external driving circuit. The end portion of the gate line GL may have a planar area larger than a planar area of another portion of the gate line GL. The gate line GL may include a material and a structure (e.g., a multilayer structure) substantially the same as those of the gate electrode GE. The gate line GL and the gate electrode GE may be simultaneously provided by substantially the same process.

As illustrated in FIG. 2, the gate insulating layer 311 is disposed on the first substrate 301, the gate electrode GE, and the gate line GL according to an exemplary embodiment of the present invention. In such an exemplary embodiment, the gate insulating layer 311 may be disposed over an entire surface of the first substrate 301 including the gate electrode GE and the gate line GL.

The gate insulating layer 311 may include or be formed of, for example, silicon nitride (SiNx) or silicon oxide (SiOx). The gate insulating layer 311 may have a multilayer structure including at least two insulating layers having different physical properties.

As illustrated in FIG. 2, the semiconductor layer 321 is disposed on the gate insulating layer 311. As illustrated in FIGS. 1 and 2, the semiconductor layer 321 overlaps at least a portion of the gate electrode GE.

The semiconductor layer 321 may include, for example, amorphous silicon, polycrystalline silicon, or the like. In addition, the semiconductor layer 321 may include or be formed of polycrystalline silicon and/or an oxide semiconductor such as, for example, indium gallium zinc oxide (IGZO) or indium zinc tin oxide (IZTO).

The source electrode SE is disposed on the gate insulating layer 311 and the semiconductor layer 321. The source electrode SE overlaps the semiconductor layer 321 and the gate electrode GE. As shown in FIG. 1, the source electrode SE may have a shape protruding from the data line DL toward the gate electrode GE. The source electrode SE and the data line DL may be unitary. The source electrode SE may be a portion of the data line DL.

The source electrode SE may include or be formed of a refractory metal, such as, for example, molybdenum, chromium, tantalum, titanium, an alloy thereof, or combinations thereof. The source electrode SE may have a multilayer structure including a refractory metal layer and a low-resistance conductive layer. Examples of the multilayer structure may include: a double-layer structure including a chromium or molybdenum (alloy) lower layer and an aluminum (alloy) upper layer; and a triple-layer structure including a molybdenum (alloy) lower layer, an aluminum (alloy) intermediate layer, and a molybdenum (alloy) upper layer. In an exemplary embodiment of the present invention, the source electrode SE may include or be formed of any suitable metals and/or conductors other than the aforementioned materials.

As illustrated in FIG. 2, the data line DL is disposed on the gate insulating layer 311. An end portion of the data line DL may be connected to another layer or an external driving circuit. The end portion of the data line DL may have a planar area larger than a planar area of another portion of the data line DL. The data line DL may include a material and a structure (e.g., a multilayer structure) substantially the same as those of the source electrode SE. The data line DL and the source electrode SE may be simultaneously provided by substantially the same process.

The data line DL intersects the gate line GL. A portion of the data line DL intersecting the gate line GL may have a line width smaller than a line width of another portion of the data line DL, and a portion of the gate line GL intersecting the data line DL may have a line width smaller than a line width of another portion of the gate line GL. Accordingly, a parasitic capacitance between the data line DL and the gate line GL may be reduced.

The drain electrode DE is disposed on the gate insulating layer 311 and the semiconductor layer 321, and is spaced apart from the source electrode SE at a predetermined distance. The drain electrode DE overlaps the semiconductor layer 321 and the gate electrode GE. A channel area of the switching element TFT is positioned between the drain electrode DE and the source electrode SE. The channel area of the switching element TFT is a portion of the semiconductor 321.

In an exemplary embodiment of the present invention, the drain electrode DE is connected to the polarization pattern 700. The drain electrode DE is connected to the pixel electrode PE through the polarization pattern 700. In such an exemplary embodiment, the drain electrode DE and the polarization pattern 700 are electrically connected to each other through a first contact hole 951. The first contact hole 951 is defined in the planarization layer 356 as a connecting portion between the switching element TFT and the polarization pattern 700.

The drain electrode DE may include a material and a structure (e.g., a multilayer structure) substantially the same as those of the source electrode SE. The drain electrode DE and the source electrode SE may be simultaneously provided by substantially the same process.

The switching element TFT may further include a first ohmic contact layer 321a and a second ohmic contact layer 321b.

The first ohmic contact layer 321a is disposed between the semiconductor layer 321 and the source electrode SE, and may reduce an interfacial resistance between the semiconductor layer 321 and the source electrode SE.

The first ohmic contact layer 321a may include silicide or n+ hydrogenated amorphous silicon doped with n-type impurity ions, e.g., phosphorus (P) or phosphine ($PH_3$), at high concentration.

The second ohmic contact layer 321b is disposed between the semiconductor layer 321 and the drain electrode DE, and may reduce an interfacial resistance between the semiconductor layer 321 and the drain electrode DE. The second ohmic contact layer 321b may include a material and a structure (e.g., a multilayer structure) substantially the same as those of the aforementioned first ohmic contact layer 321a. The second ohmic contact layer 321b and the first ohmic contact layer 321a may be simultaneously provided by substantially the same process.

In an exemplary embodiment of the present invention, the semiconductor layer 321 may further be disposed between the gate insulating layer 311 and the source electrode SE. In addition, the semiconductor layer 321 may further be disposed between the gate insulating layer 311 and the drain electrode DE. In such an exemplary embodiment, the semiconductor layer between the gate insulating layer 311 and the source electrode SE is defined as a first additional semiconductor layer, and the semiconductor layer between the gate insulating layer 311 and the drain electrode DE is defined as a second additional semiconductor layer. In such an exemplary embodiment, the aforementioned first ohmic contact layer 321a may further be disposed between the first additional semiconductor layer and the source electrode SE, and the aforementioned second ohmic contact layer 321b may further be disposed between the second additional semiconductor layer and the drain electrode DE.

In an exemplary embodiment of the present invention, the semiconductor layer 321 may further be disposed between the gate insulating layer 311 and the data line DL. In such an exemplary embodiment, the semiconductor layer between the gate insulating layer 311 and the data line DL is defined as a third additional semiconductor layer. In such an exemplary embodiment, the aforementioned first ohmic contact layer 321a may further be disposed between the third additional semiconductor layer and the data line DL.

In an exemplary embodiment of the present invention, the color filter 354 is disposed vertically on the gate insulating layer 311. The color filter 354 is disposed to an area, in a plan view, corresponding to a light emission area 111 of the pixel PX. In such an exemplary embodiment, a portion of the color filter 354 may extend further outwardly from the light emission area 111 to a light blocking area. For example, an edge portion of the color filter 354 may be disposed in the light blocking area. The edge portion of the color filter 354 in the light blocking area may vertically overlap the drain electrode DE. In an exemplary embodiment of the present invention, the color filter 354 may be omitted.

Adjacent ones of the color filters are spaced apart from each other at a predetermined distance, and are disposed on the gate insulating layer 311. For example, as illustrated in FIG. 2, a color filter 354 of one pixel and a color filter 354' of another pixel that is adjacent to this pixel may be spaced apart from each other at a predetermined distance.

The color conversion layer 195 is disposed vertically on the color filter 354, and is disposed to an area, in a plan view, corresponding to the light emission area 111. The color conversion layer 195 and the color filter 354 may be provided by substantially the same mask process. Accordingly, in a plan view, the color conversion layer 195 and the color filter 354 may have substantially the same shape.

The color conversion layer 195 converts a color of a light L emitted from the backlight unit 444. To this end, the color conversion layer 195 converts a wavelength of the light L emitted from the backlight unit 444. For example, the color conversion layer 195 may include a quantum dot particle. In addition, the color conversion layer 195 may further include at least one of (or any combination of) a sulfide-based metal, a silicon (Si)-based metal, and a nitride-based metal.

The quantum dot particle converts wavelength of light to emit a desired light. For example, the wavelength of light emitted from the color conversion layer 195 may vary depending on the size of the quantum dot particle used in the color conversion layer 195. In other words, based on the choice of a diameter of the quantum dot, color of light emitted from the color conversion layer 195 may vary accordingly.

The quantum dot particle may have a diameter in a range of about 2 nanometer (nm) to about 10 nm. In general, in a case where the quantum dot particle has a relatively small diameter, a wavelength of an emitted light may decrease to generate a blue-based light. Further, as the size of the quantum dot increases, the wavelength of the emitted light may increase accordingly to emit a red-based light. For example, a quantum dot particle having a diameter of about 10 nm may emit red light, a quantum dot particle having a diameter of about 7 nm may emit green light, and a quantum dot particle having a diameter of about 5 nm may emit blue light.

The quantum dot particle may have a double structure including an inner core and an outer shell surrounding the inner core. For example, the quantum dot particle including CdSe/ZnS includes an inner core including CdSe and an outer shell including ZnS.

In an exemplary embodiment of the present invention, the color conversion layer 195 may include a quantum rod particle, in lieu of the quantum dot particle.

In an exemplary embodiment of the present invention, the plurality of pixels PX may include a red pixel, a green pixel, and a blue pixel. In such an exemplary embodiment, a color conversion layer (hereinafter, a red color conversion layer) of the red pixel converts white light provided from the backlight unit 444 into red light, a color conversion layer (hereinafter, a green color conversion layer) of the green pixel converts white light provided from the backlight unit 444 into green light, and a color conversion layer (hereinafter, a blue color conversion layer) of the blue pixel converts white light provided from the backlight unit 444 into blue light.

In an exemplary embodiment of the present invention, in a case where blue light is emitted from the backlight unit 444, the blue pixel may include a light transmission layer, in lieu of the color conversion layer and the color filter. The light transmission layer intactly transmits the blue light provided from the backlight unit 444 without a substantial change in color (or wavelength). The light transmission layer may include, for example, a transparent photoresist. In an exemplary embodiment of the present invention, the light transmission layer may further include a light scattering agent. The light scattering agent may include titanium dioxide ($TiO_2$).

As described hereinabove, when blue light is emitted from the backlight unit 444, the red color conversion layer may convert the blue light into red light, and the green color conversion layer may convert the blue light into green light.

The color filter 354 may include, for example, a red color filter, a green color filter, and a blue color filter. The red color filter is disposed between the red color conversion layer and the gate insulating layer 311, the green color filter is disposed between the green color conversion layer and the gate insulating layer 311, and the blue color filter is disposed between the blue color conversion layer and the gate insulating layer 311. In an exemplary embodiment of the present invention, when blue light is emitted from the backlight unit 444, the blue color filter may be omitted. In other words, the blue color filter may be substituted by the aforementioned light transmission layer.

The light L emitted from the backlight unit 444 passes through the color conversion layer 195 to reach the color filter 354, and the aforementioned color filter 354 enhances propagation straightness of the light having passed through the color conversion layer 195.

In an exemplary embodiment of the present invention, a blue-cut filter may further be disposed between the color conversion layer 195 and the color filter 354. The blue-cut filter is used when the light L provided from the backlight unit 444 is blue light. The blue-cut filter is disposed between the red color conversion layer and the red color filter. In addition, the blue-cut filter is disposed between the green color conversion layer and the green color filter. The blue-cut filter blocks a blue light having passed through the red color conversion layer without being converted into a red light, and a blue light having passed through the green color conversion layer without being converted into a green light. However, the blue-cut filter is absent between the blue color conversion layer and the blue color filter. The blue-cut filter may have a refractive index which is higher than that of the color conversion layer and lower than that of the color filter. The blue-cut filter may use an air layer.

The capping layer 391 prevents spread of an undesired material generated from the color filter 354. As illustrated in FIG. 2, according to an exemplary embodiment of the present invention, the capping layer 391 is disposed on the data line DL, the source electrode SE, the drain electrode DE, the channel area of the semiconductor layer 321, the gate insulating layer 311, and the color conversion layer 195. In such an exemplary embodiment, the capping layer 391 may be disposed over an entire surface of the first substrate 301 including the data line DL, the source electrode SE, the drain electrode DE, the channel area of the semiconductor layer 321, the gate insulating layer 311, and the color conversion layer 195. In addition, the capping layer 391 is disposed between adjacent ones of the color filters 354. In addition, the capping layer 391 is disposed between adjacent ones of the color conversion layers 195. The capping layer 391 is defined with a hole (hereinafter, a first hole) defined on the drain electrode DE. The capping layer 391 may include silicon nitride or silicon oxide. In an exemplary embodiment of the present invention, the capping layer 391 may be omitted.

As illustrated in FIG. 2, the planarization layer 356 is disposed on the capping layer 391. In addition, the planarization layer 356 is disposed between adjacent ones of the color filters 354. In addition, the planarization layer 356 is disposed between adjacent ones of the color conversion layers 195. The planarization layer 356 overlaps the switching element TFT and the color conversion layer 195. The planarization layer 356 is defined with a hole (hereinafter, a second hole) above the first hole. The second hole may be larger than the first hole. For example, a diameter of the second hole may be greater than a diameter of the first hole. In addition, as illustrated in FIG. 2, the planarization layer 356 may be defined with a first groove 981 and a second groove 982. The first groove 981 is defined corresponding to the switching element TFT. The second groove 982 is defined corresponding to the gate line GL. The second groove 982 is defined along the gate line GL. A depth of the first groove 981 may be substantially the same as a depth of the second groove 982. A depth of the first contact hole 951 may be greater than the depths of the first and second grooves 981 and 982. The planarization layer 356 may include an organic layer having a low dielectric constant.

The polarization pattern 700 polarizes light emitted from the backlight unit 444 having passed through the polarization plate 381 and the liquid crystal layer 333. As illustrated in FIG. 2, according to an exemplary embodiment of the present invention, the polarization pattern 700 is disposed on the planarization layer 356. In such an exemplary embodiment, the polarization pattern 700 is disposed on a portion of the planarization layer 356 aside from the first groove 981 and the second groove 982. In other words, the polarization pattern 700 is absent in the first and second grooves 981 and 982. The first groove 981 corresponding to the switching element TFT is positioned between the polarization pattern 700 of the current pixel and another polarization pattern of an adjacent pixel. The second groove 982 is defined along the gate line GL and may divide a polarization line 750, which is included in the polarization pattern 700, of the current pixel and another polarization line of an adjacent pixel. The polarization pattern 700 is connected to the switching element TFT through the first contact hole 951. For example, the polarization pattern 700 is connected to the drain electrode DE of the switching element TFT through the first contact hole 951.

The first contact hole 951 includes the first hole of the capping layer 391 and the second hole of the planarization layer 356. A portion of the drain electrode DE is exposed through the first contact hole 951. In an exemplary embodiment of the present invention, the second hole may be larger than the first hole. In such an exemplary embodiment, each of the polarization pattern 700 and the pixel electrode PE at an inner wall of the first contact hole 951 may include a plurality of curved portions. Accordingly, the polarization pattern 700 and the pixel electrode PE may not be damaged in the first contact hole 951 which has a large depth. For example, the polarization pattern 700 and the pixel electrode PE may be prevented from being cut.

The polarization pattern 700 may be transferred to the planarization layer 356 by a method of stamping or imprinting. The polarization pattern 700 may be a wire grid polarizer. The polarization pattern 700 may include a metal material such as aluminum.

As illustrated in FIG. 1, the polarization pattern 700 may include a plurality of polarization lines 750. Each of the polarization lines 750 is substantially parallel to the data line DL. In addition, the polarization lines 750 are each parallel to one another.

The polarization lines 750 are spaced apart from each other at a predetermined distance. A gap (hereinafter, a first gap) between two adjacent ones of the polarization lines 750 may be substantially the same as a gap (hereinafter, a second gap) between another two adjacent ones of the polarization lines 750. In an exemplary embodiment of the present invention, the first gap may differ from the second gap. In addition, a gap (hereinafter, a third gap) between one of the polarization lines 750 and another of the polarization lines 750 adjacent to the left side of the one of the polarization lines 750 may be substantially the same as a gap (hereinafter, a fourth gap) between the one of the polarization lines 750 and another of the polarization lines 750 adjacent to the right side of the one of the polarization lines 750. In an exemplary embodiment of the present invention, the third gap may differ from the fourth gap. A gap between adjacent ones of the polarization lines 750 is less than a wavelength (about 400 nm to about 800 nm) of a visible ray. For example, the gap between adjacent ones of the polarization lines 750 may be greater than 0 and less than about 40 nm.

At least one of the plurality of polarization lines 750 may be connected to the switching element TFT. For example, as illustrated in FIG. 1, one of the polarization lines 750 overlapping the drain electrode DE may be connected to the drain electrode DE through the first contact hole 951.

In an exemplary embodiment of the present invention, the polarization pattern 700 may overlap a previous gate line GL'. For example, at least one of the plurality of polarization lines 750 of the polarization pattern 700 may overlap the previous gate line GL'. In a single frame period, the previous gate line GL' may be driven before the gate line GL is driven.

The passivation layer 320 is disposed on the polarization pattern 700. The passivation layer 320 is absent between adjacent ones of the polarization lines 750. That is, the polarization lines 750 are spaced apart from each other at a significantly small gap measured in nanometers, and thus the passivation layer 320 is absent between adjacent ones of the polarization lines 750. Accordingly, a portion of the passivation layer 320 faces the planarization layer 356 without polarization lines 750 interposed therebetween. A hole 909 defined by being surrounded by the polarization lines 750, the planarization layer 356, and the passivation layer 320 that are adjacent to one another may be filled with air. In addition, the passivation layer 320 may be defined with a second contact hole 952. A portion of the polarization pattern 700 is exposed by the second contact hole 952.

In an exemplary embodiment of the present invention, the passivation layer 320 may include an inorganic insulating material such as, for example, silicon nitride ($SiN_x$) or silicon oxide ($SiO_x$), and in such an exemplary embodiment, an inorganic insulating material having photosensitivity and having a dielectric constant of about 4.0 may be used. In an exemplary embodiment of the present invention, the passivation layer 320 may have a double-layer structure including a lower inorganic layer and an upper organic layer.

As illustrated in FIG. 1, the first contact hole 951 and the second contact hole 952 may be positioned to overlap one polarization line, but alternatively, the first contact hole 951 and the second contact hole 952 may be positioned to overlap different polarization lines, respectively.

The pixel electrode PE is disposed vertically on the passivation layer 320. The pixel electrode PE is disposed to an area, in a plan view, corresponding to the light emission area 111. A portion of the pixel electrode PE extends outwardly from the light emission area 111 to the light blocking area. For example, an edge portion of the pixel electrode PE is disposed in the light blocking area. The pixel electrode PE is connected to the polarization pattern 700 through the second contact hole 952. In other words, the pixel electrode PE is connected to the polarization pattern 700 through the second contact hole 952 in the light blocking area. The pixel electrode PE overlaps the polarization pattern 700. For example, the pixel electrode PE may overlap at least one polarization line 750.

As illustrated in FIG. 1, the pixel electrode PE may overlap the previous gate line GL'. A storage capacitor may be formed between the pixel electrode PE and the previous gate line GL'.

In an exemplary embodiment of the present invention, the pixel electrode PE may include a transparent conductive material, e.g., indium tin oxide (ITO) or indium zinc oxide (IZO). In such an exemplary embodiment, for example, ITO may include a polycrystalline material or a monocrystalline material, and IZO may include a polycrystalline material or a monocrystalline material. Alternatively, IZO may include an amorphous material.

The light blocking layer 376 blocks light from being emitted towards an area (i.e., the light blocking area) except the light emission area 111. To this end, the light blocking layer 376 is disposed in the light blocking area. For example, as illustrated in FIG. 2, the light blocking layer 376 is disposed on the planarization layer 356, the passivation layer 320, and the pixel electrode PE corresponding to the light blocking area.

As illustrated in FIG. 2, a column spacer 472 is disposed on the light blocking layer 376. For example, the column spacer 472 may be disposed on the light blocking layer 376 to overlap the switching element TFT. The column spacer 472 and the light blocking layer 376 may be unitary. The column spacer 472 and the light blocking layer 376 may be simultaneously provided by substantially the same process. The column spacer 472 may be used to maintain a space between the first substrate 301 and the second substrate 302.

A first alignment layer may be disposed on the light blocking layer 376, the column spacer 472, and the pixel electrode PE. The first alignment layer may be a rubbed alignment layer or an unrubbed alignment layer.

The common electrode 330 is disposed on the second substrate 302. The common electrode 330 may be disposed over an entire surface of the second substrate 302. The common electrode 330 and the pixel electrode PE may include or be formed of substantially the same material. In an exemplary embodiment of the present invention, when the pixel electrode PE includes IZO, the common electrode 330 may include ITO.

A second alignment layer may be disposed on the common electrode 330. The second alignment layer may be a rubbed alignment layer or an unrubbed alignment layer.

The liquid crystal layer 333 is disposed between the first substrate 301 and the second substrate 302. The common electrode 330 disposed on the second substrate 302 may then be interposed between the liquid crystal layer 333 and the second substrate 302. For example, the liquid crystal layer 333 is disposed between the first alignment layer on the first substrate 301 and the second alignment layer on the second substrate 302. The switching element TFT and the pixel electrode PE may drive liquid crystal molecules of the liquid crystal layer 333.

The liquid crystal layer 333 may include a nematic liquid crystal material having a positive dielectric anisotropy. The liquid crystal molecules of the liquid crystal layer 333 may have a structure in which a major axis thereof is aligned parallel to one of the first substrate 301 and the second substrate 302, and the direction is spirally twisted about 90 degrees from a rubbing direction of the first alignment layer to the second substrate 302.

In an exemplary embodiment of the present invention, the liquid crystal layer 333 may include homeotropic liquid crystal materials, rather than the nematic liquid crystal material. In such an exemplary embodiment, the first alignment layer may be a homeotropic alignment layer or an alignment layer including a photoreactive material. In addition, the second alignment layer may be a homeotropic alignment layer or a photoaligned layer using a photopolymerizable material.

In an exemplary embodiment of the present invention, the liquid crystal layer 333 may include liquid crystal molecules having a negative dielectric anisotropy, rather than the nematic liquid crystal material.

The polarization plate 381 polarizes the light L emitted from the backlight unit 444. The polarization plate 381 is disposed between the backlight unit 444 and the second substrate 302.

In an exemplary embodiment of the present invention, the aforementioned switching element TFT, the color filter 354, the color conversion layer 195, the polarization pattern 700, the pixel electrode PE, the light blocking layer 376, and the column spacer 472 are disposed on the first substrate 301. In other words, the switching element TFT, the color filter 354, the color conversion layer 195, the polarization pattern 700, the pixel electrode PE, the light blocking layer 376, and the column spacer 472 are disposed between the first substrate 301 and the liquid crystal layer 333. In such an exemplary embodiment, as the switching element TFT, the color conversion layer 195, and the polarization pattern 700 are disposed on the same substrate, i.e., the first substrate 301, alignment condition among the switching element TFT, the color conversion layer 195, and the polarization pattern 700 is relatively excellent. In addition, as the switching element TFT, the color conversion layer 195, and the pixel electrode PE are disposed on the same substrate, i.e., the first substrate 301, a distance between the pixel electrode PE and the data line DL may increase due to the color conversion layer 195. Accordingly, coupling phenomenon between the pixel electrode PE and the data line DL may be prevented. Accordingly, as illustrated in FIG. 1, the pixel electrode PE may further extend onto the data line DL. That is, the pixel electrode PE may overlap the data line DL. Accordingly, an aperture ratio of the pixel PX may increase.

Figure 3:
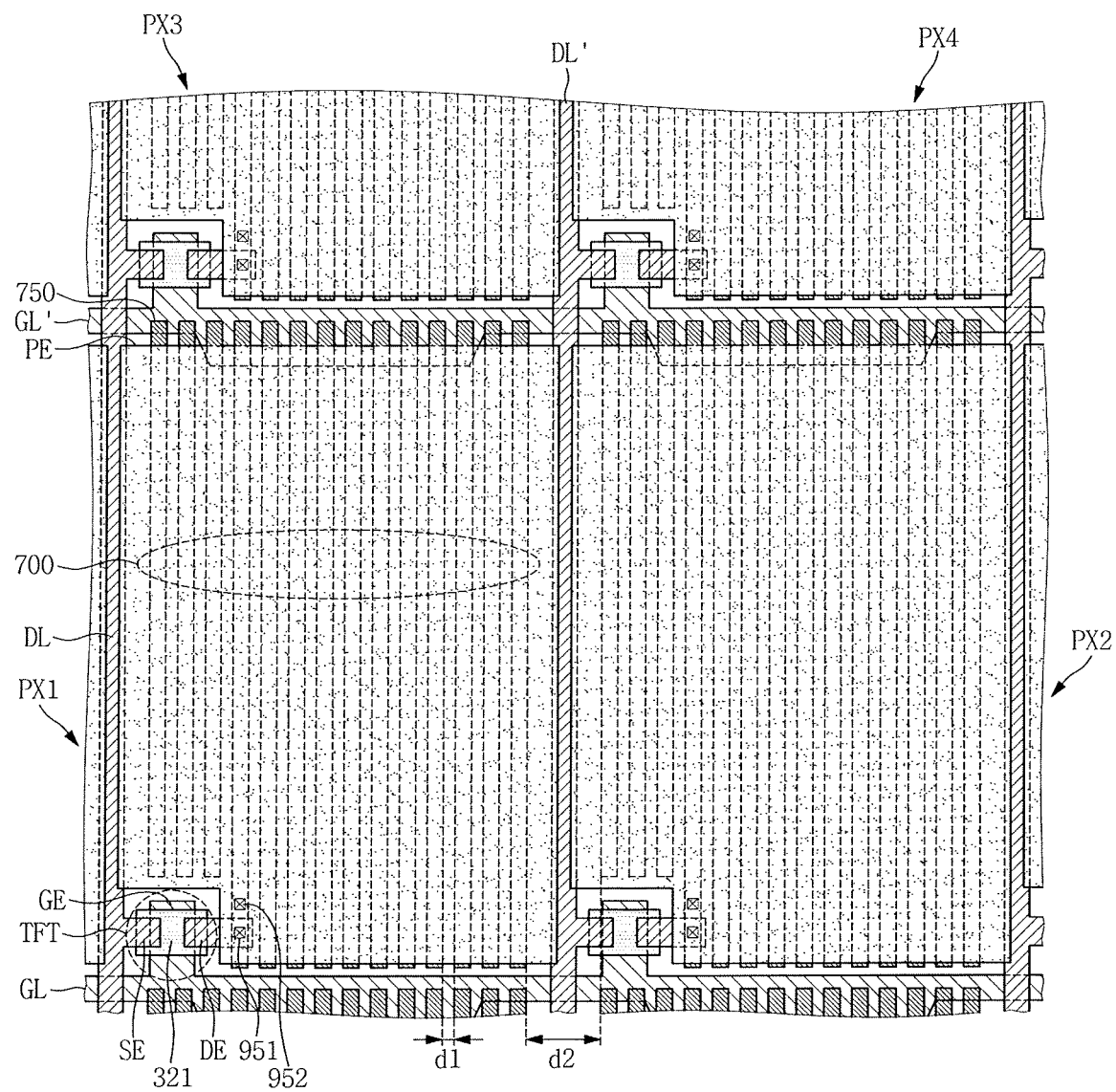
FIG. 3 is a plan view illustrating a plurality of pixels according to an exemplary embodiment of the present invention.

FIG. 3 is a plan view illustrating a plurality of pixels according to an exemplary embodiment of the present invention.

FIG. 3 illustrates four adjacent pixels PX1, PX2, PX3, and PX4. Each of the first, second, third, and fourth pixels PX1, PX2, PX3, and PX4 may have substantially the same configuration as that of the pixel PX of FIG. 1. In an exemplary embodiment of the present invention, portions of the third and fourth pixels PX3 and PX4 are not described in FIG. 3.

Respective polarization patterns 700 of the pixels PX1, PX2, PX3, and PX4 are not connected to one another. For example, a polarization pattern 700 overlapping a pixel electrode PE of the first pixel PX1 is not connected to a polarization pattern overlapping a pixel electrode of the second pixel PX2. In addition, the polarization pattern overlapping the pixel electrode PE of the first pixel PX1 is not connected to a polarization pattern overlapping a pixel electrode of the third pixel PX3.

A distance between adjacent ones of polarization lines included in a single pixel is less than a distance between polarization lines respectively included in adjacent ones of pixels. For example, when a distance between two adjacent ones of the polarization lines 750 overlapping the pixel electrode PE of the first pixel PX1 is defined as a distance d1 and a distance between a polarization line 750 of the first pixel PX1 and a polarization line 750 of the second pixel PX2 adjacent thereto is defined as a distance d2, the distance d1 is less than the distance d2.

Figure 4:
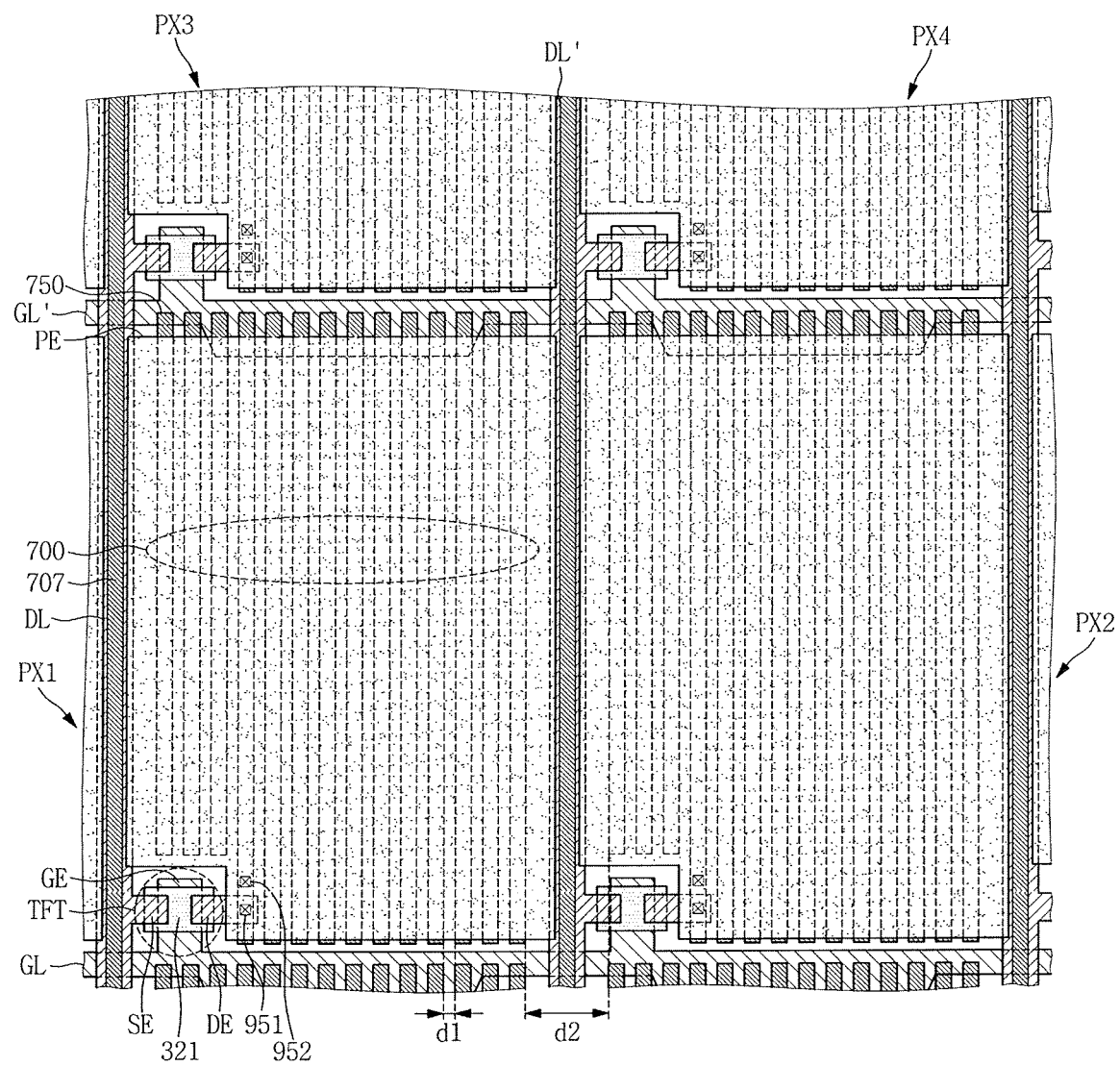
FIG. 4 is a plan view illustrating a plurality of pixels according to an exemplary embodiment of the present invention.

FIG. 4 is a plan view illustrating a plurality of pixels according to an exemplary embodiment of the present invention.

As illustrated in FIG. 4, an LCD device may further include a shielding line 707.

The shielding line 707 is disposed on the planarization layer 356 to overlap the data line DL. The shielding line 707 overlaps the data line DL and is disposed along the data line DL. A plurality of shielding lines may be disposed on a single data line. The plurality of shielding lines overlapping a single data line are spaced apart from each other at a distance d1.

The shielding line 707 and the polarization pattern 700 are disposed on substantially the same layer. The shielding line 707 and the aforementioned polarization pattern 700 may include substantially the same material and may be provided by substantially the same process. That is, the shielding line 707 may be transferred to the planarization layer 356 by a method of stamping or imprinting, similarly to the polarization pattern 700. The shielding line may include a metal material, or may include an opaque conductive material.

The shielding line 707 may receive a common voltage. The shielding line 707 prevents formation of an electric field between the data line DL and the pixel electrode PE. In addition, the shielding line 707 and the common electrode 330, that receive the same common voltage, are equipotential, such that light transmitted through the liquid crystal layer 333 between the shielding line 707 and the common electrode 330 is blocked. Accordingly, light leakage may be prevented in a portion corresponding to the data line DL. In addition, as the shielding line 707 may substitute for a portion of the light blocking layer 376 on the data line DL, when the shielding line 707 is provided, the portion of the light blocking layer 376 on the data line DL may be removed. Accordingly, when the shielding line 707 is provided, an aperture ratio of the pixel PX may further increase.

Figure 5A:
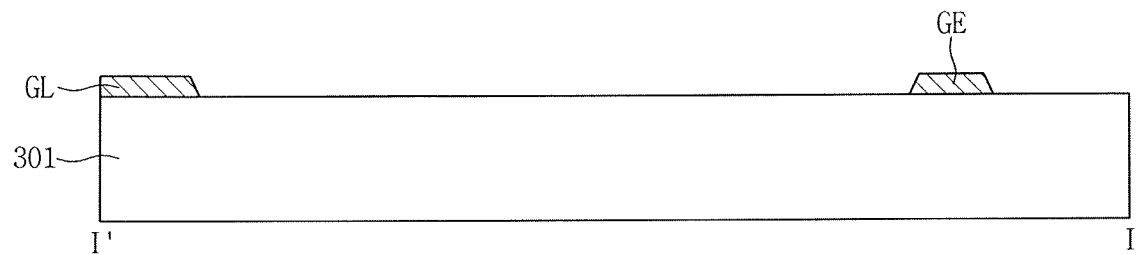
FIGS. 5A, 5B, 5C, 5D, 5E, 5F, 5G, 5H, 5I, 5J, 5K, 5L, 5M, 5N, 5O, 5P, 5Q, 5R, 5S, and 5T are cross-sectional views illustrating a process of manufacturing a display device according to an exemplary embodiment of the present invention.
Figure 5B:
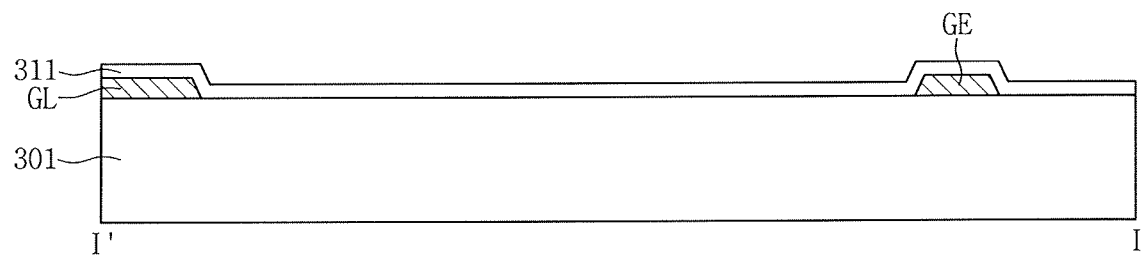
Figure 5C:
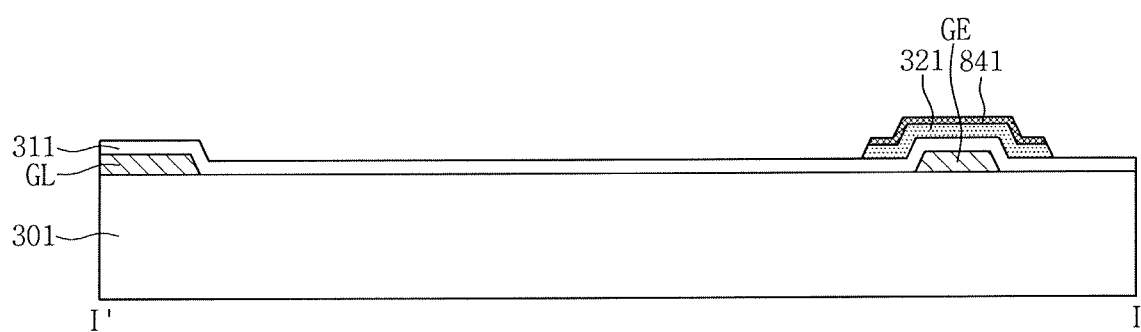
Figure 5D:
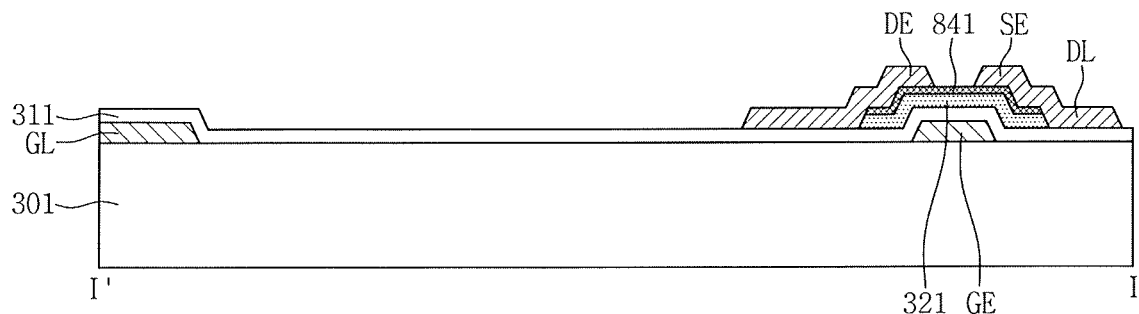
Figure 5E:
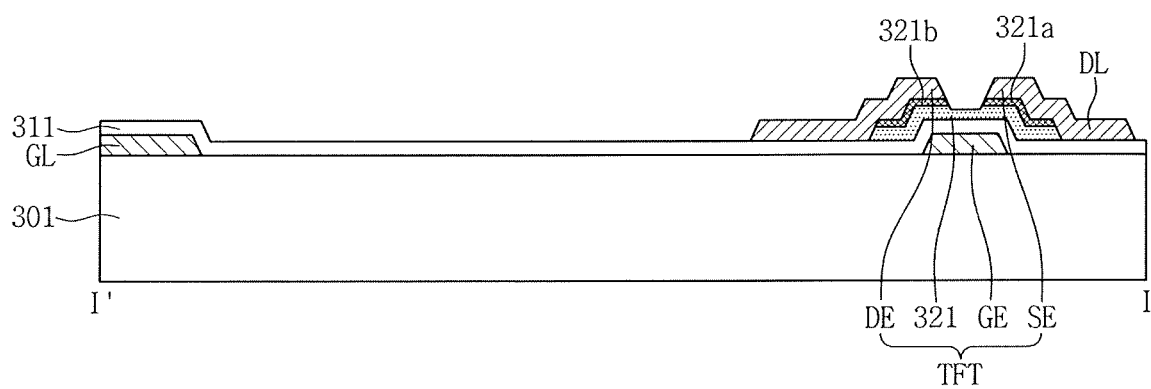
Figure 5F:
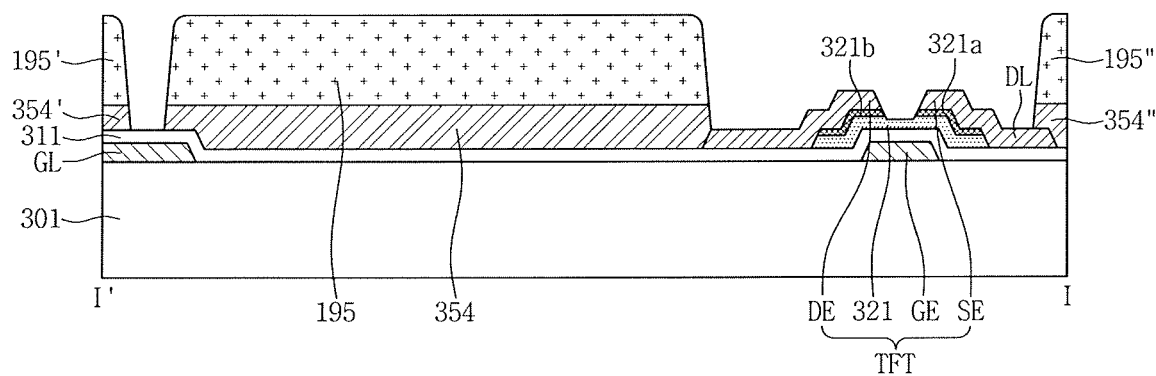
Figure 5G:
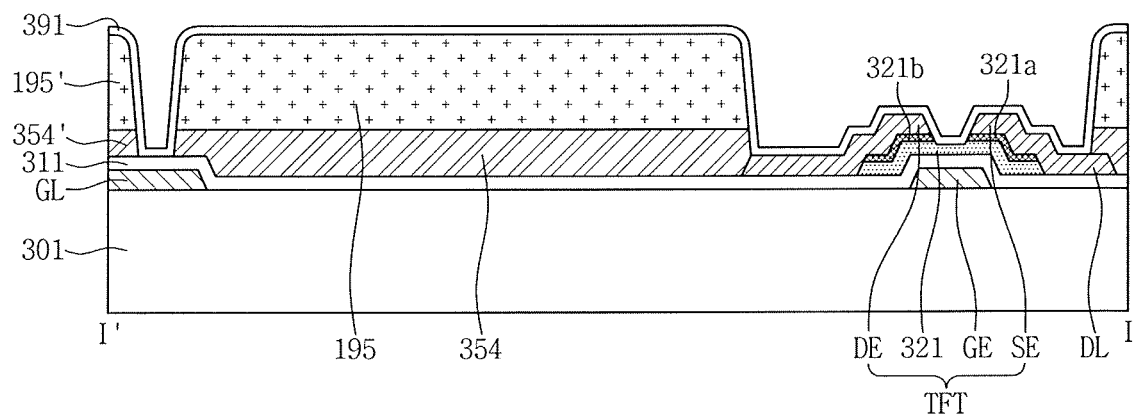
Figure 5H:
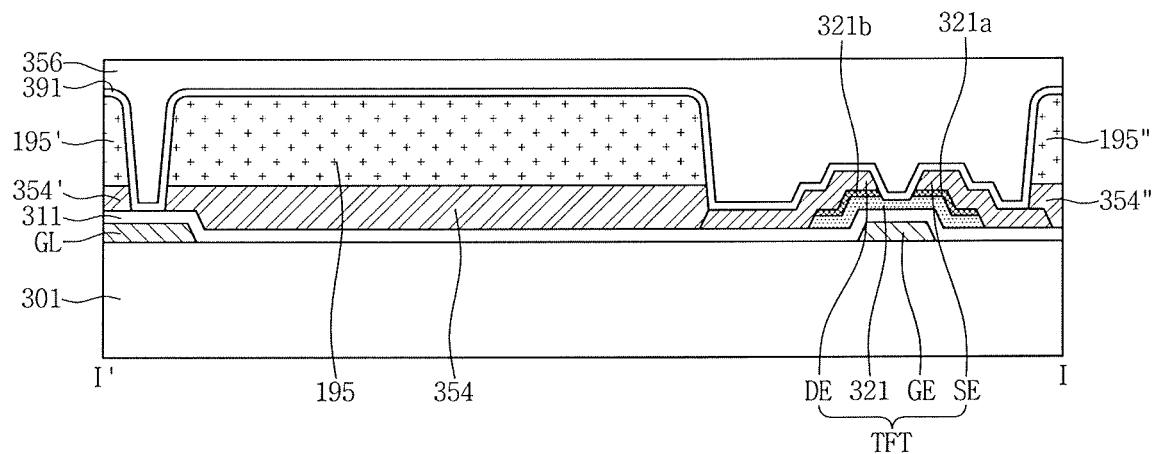
Figure 5I:
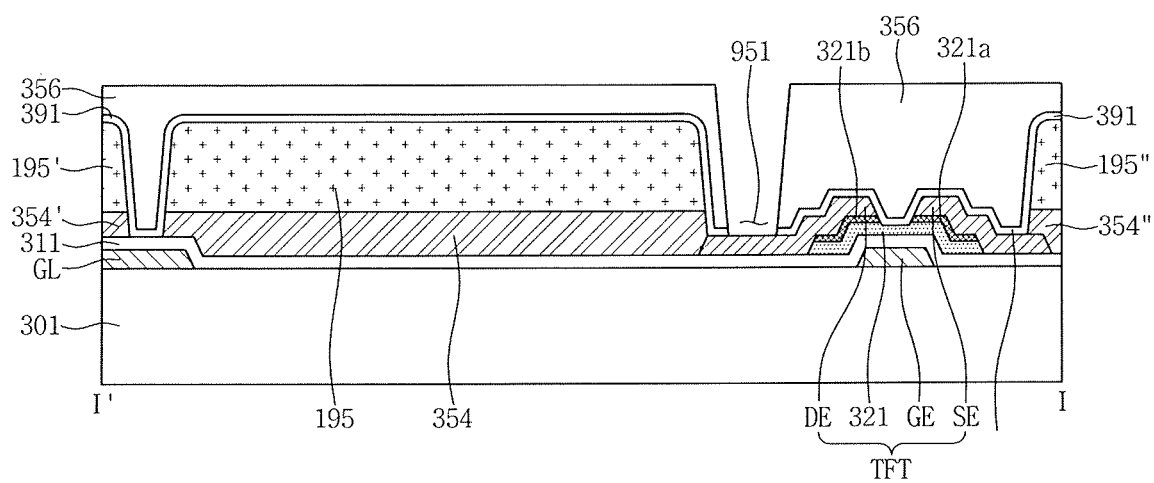
Figure 5J:
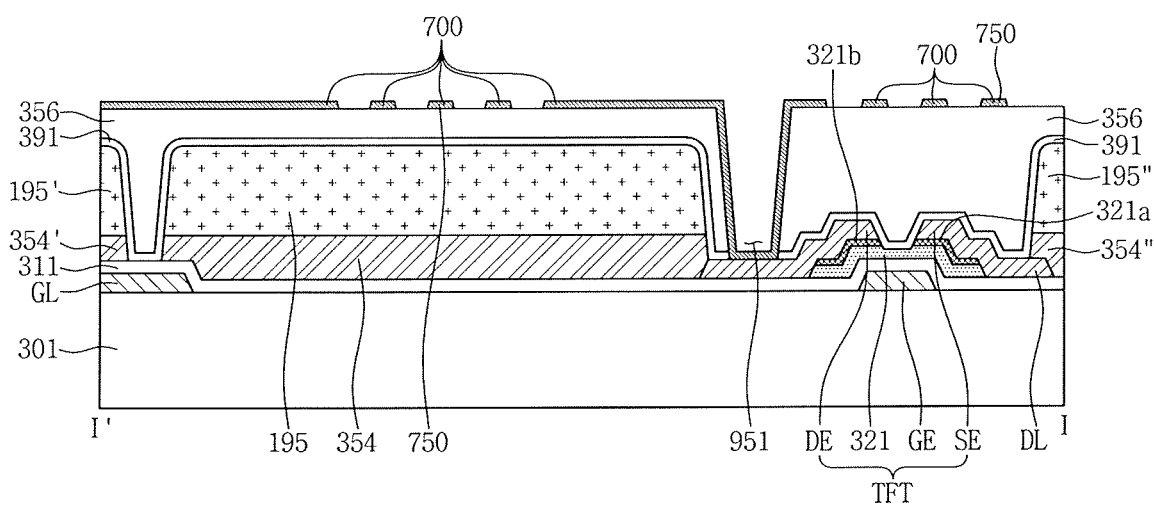
Figure 5K:
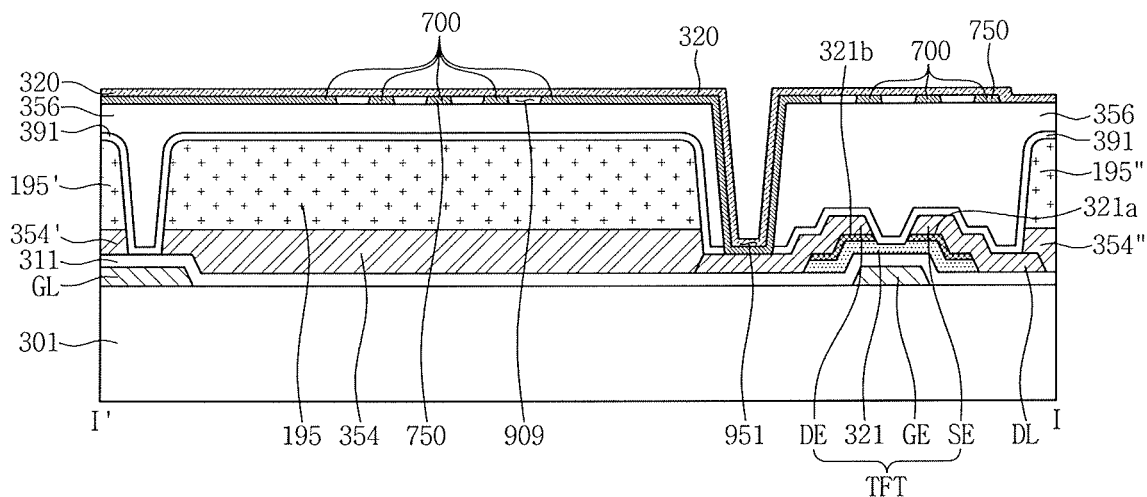
Figure 5L:
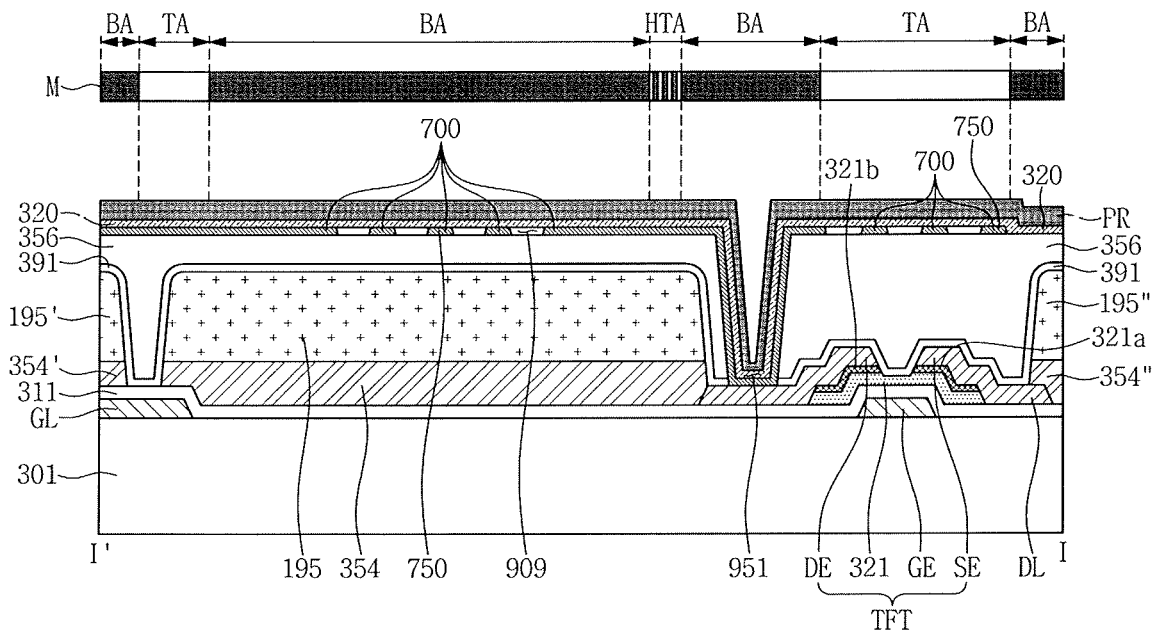
Figure 5M:
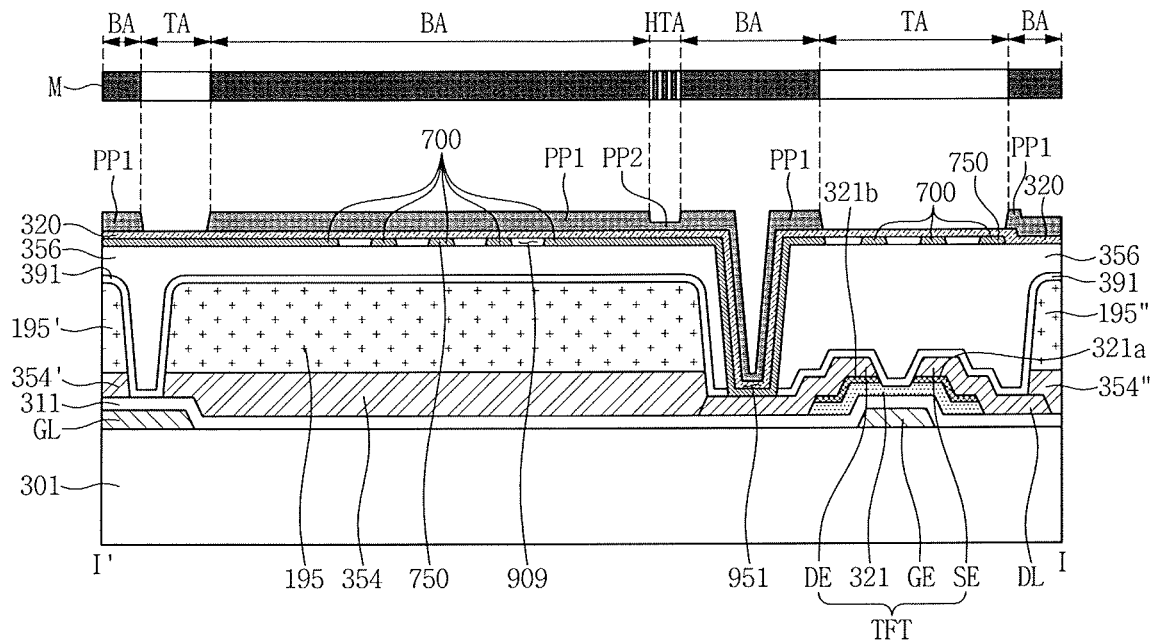
Figure 5N:
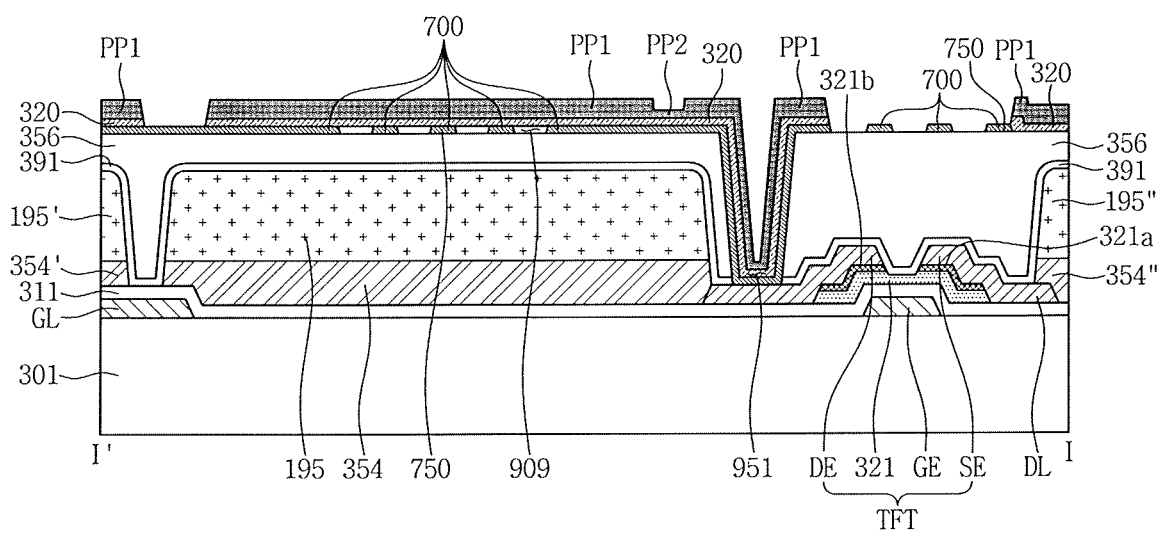
Figure 5O:
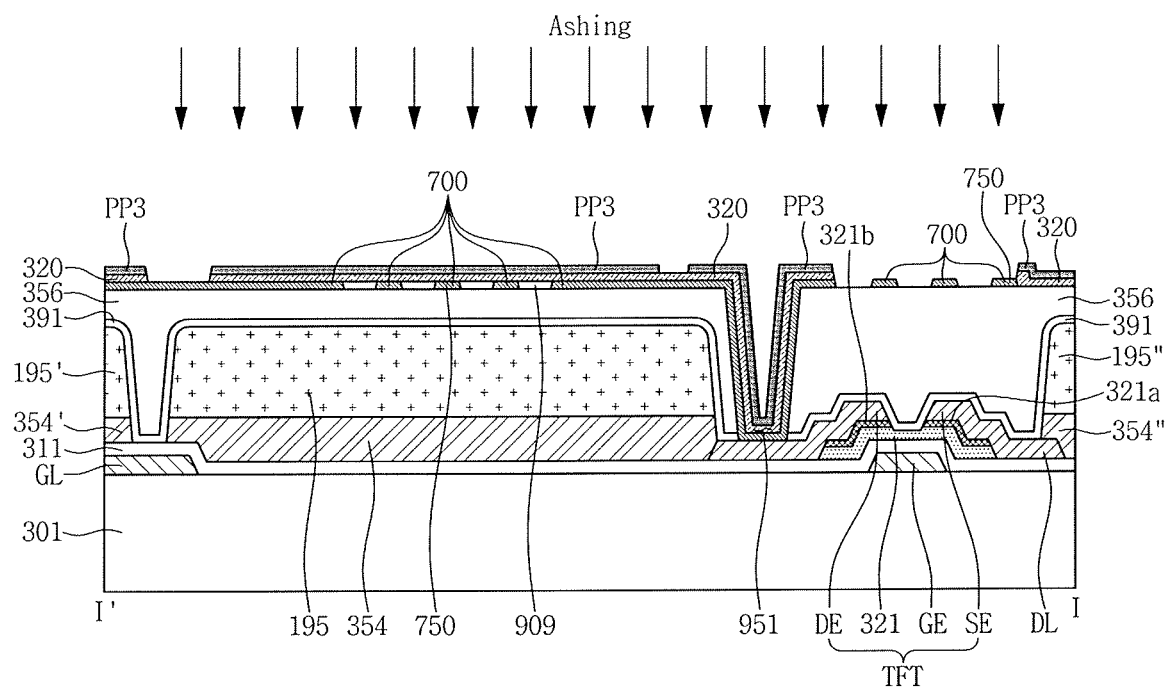
Figure 5P:
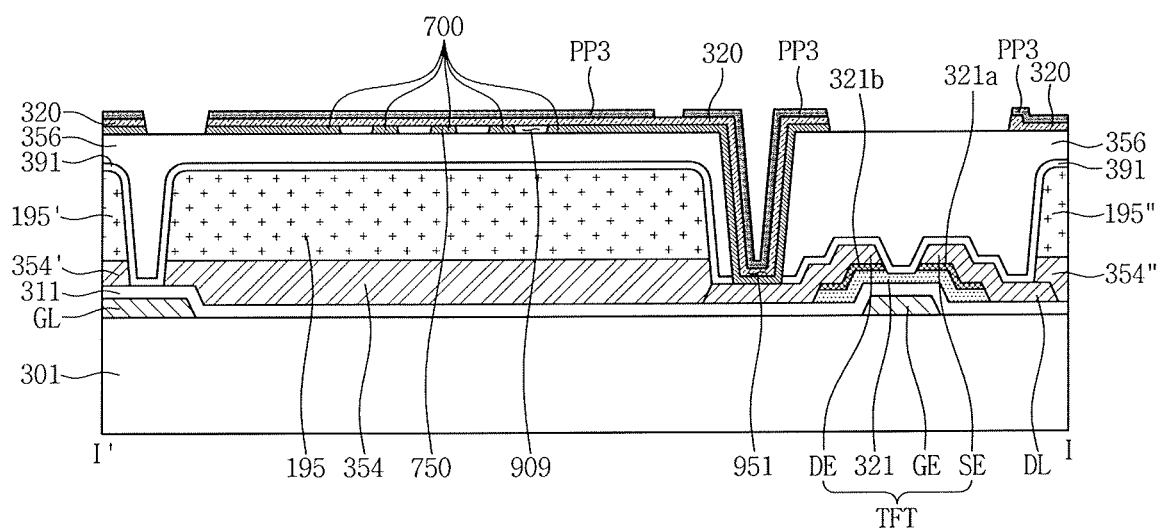
Figure 5Q:
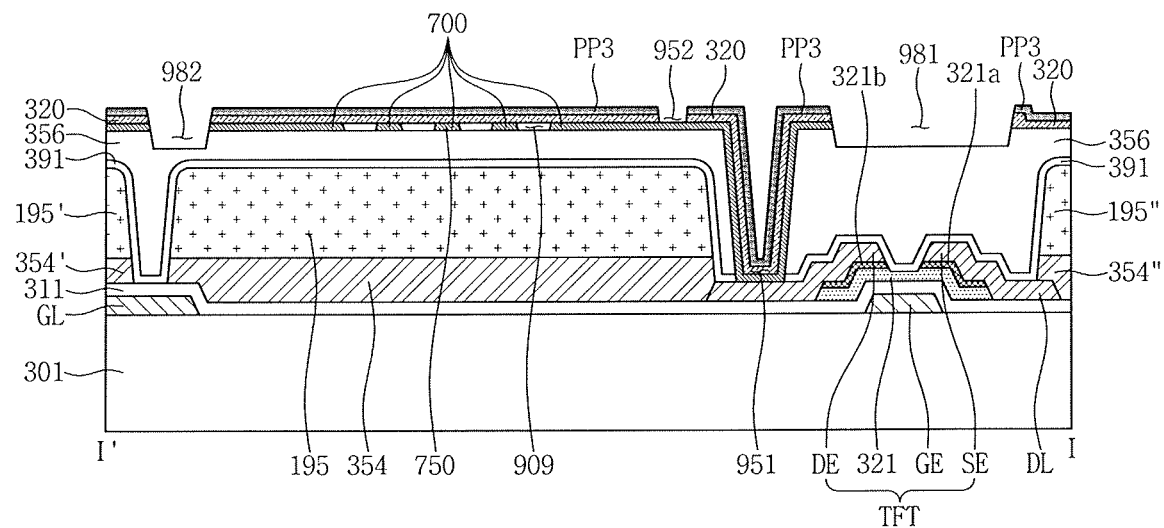
Figure 5R:
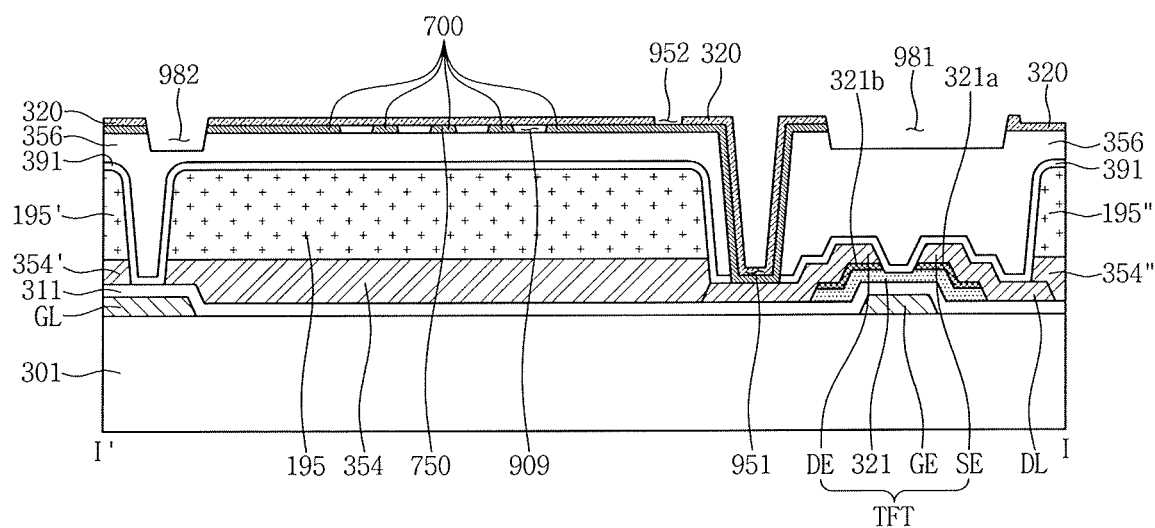
Figure 5S:
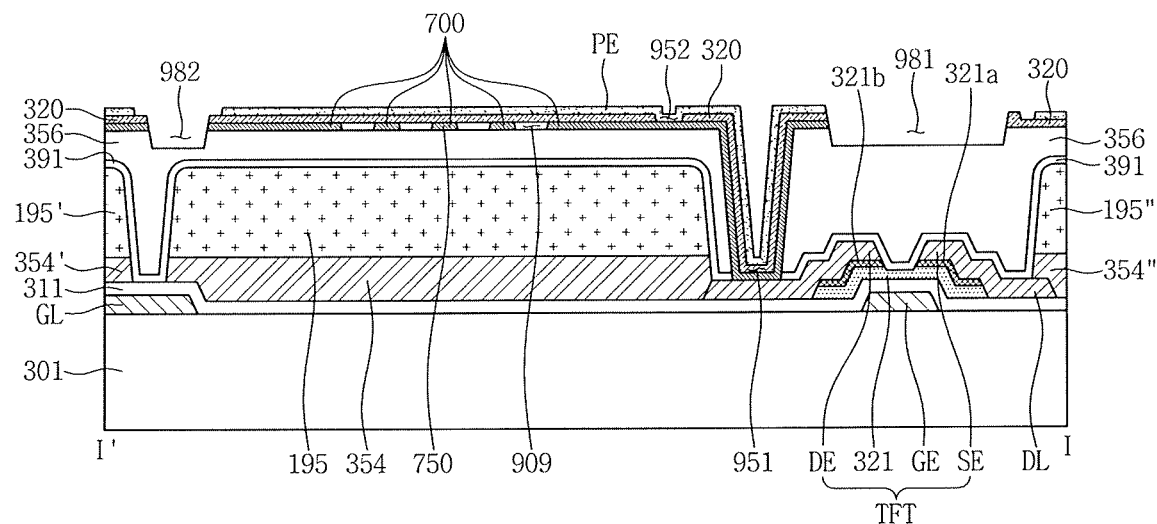
Figure 5T:
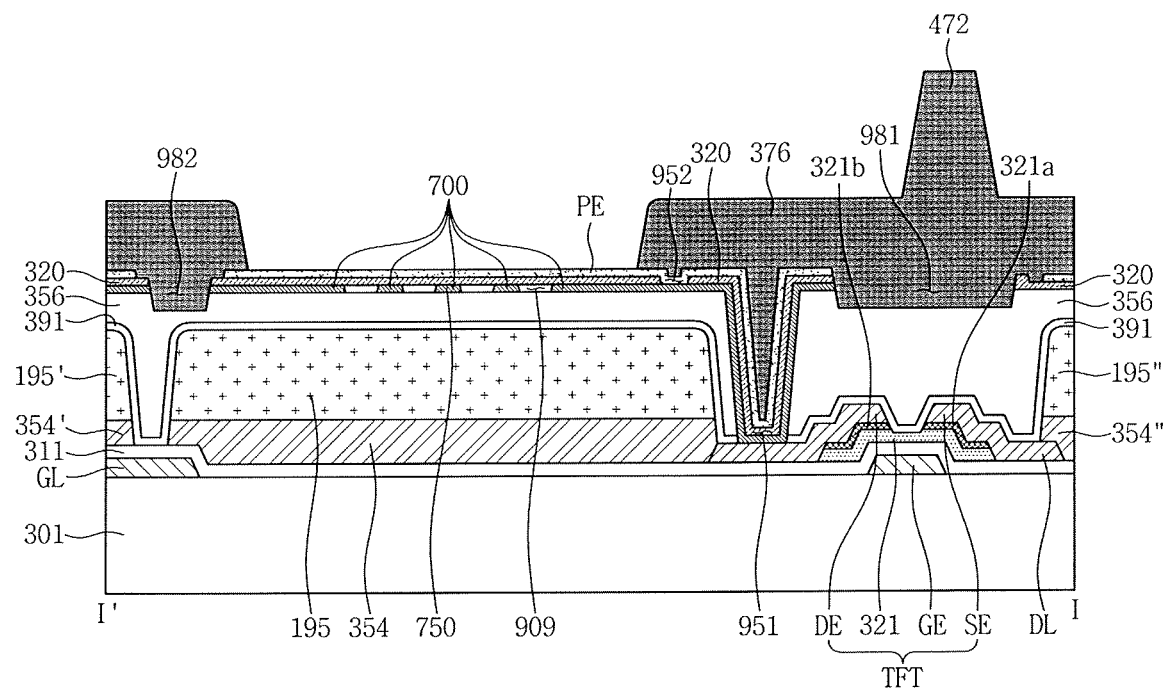
Figure 6:
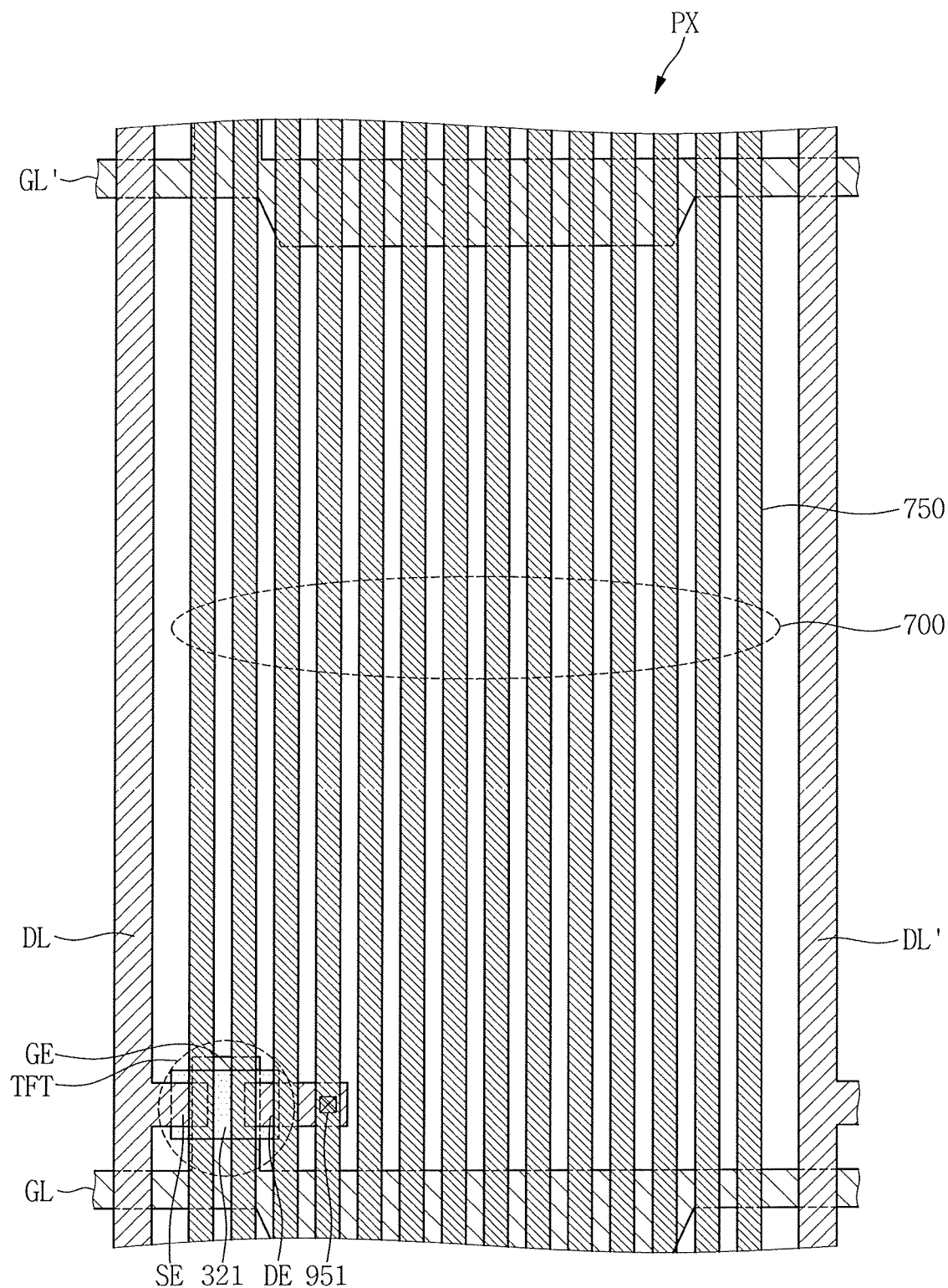
FIG. 6 is a plan view illustrating a polarization pattern of FIG. 5J according to an exemplary embodiment of the present invention.

FIGS. 5A, 5B, 5C, 5D, 5E, 5F, 5G, 5H, 5I, 5J, 5K, 5L, 5M, 5N, 5O, 5P, 5Q, 5R, 5S, and 5T are cross-sectional views illustrating a process of manufacturing a display device according to an exemplary embodiment of the present invention, and FIG. 6 is a plan view illustrating a polarization pattern of FIG. 5J.

Firstly, a gate metal layer is deposited over an entire surface of the first substrate 301. The gate metal layer may be deposited by a physical vapor deposition (PVD) method such as sputtering.

Subsequently, the gate metal layer is patterned through a photolithography process such that the gate line GL and the gate electrode GE are formed on the first substrate 301 as illustrated in FIG. 5A.

The gate metal layer may be removed by a wet-etching method using an etching solution.

The gate metal layer may include or be formed of a material included in the aforementioned gate line GL.

Subsequently, as illustrated in FIG. 5B, the gate insulating layer 311 is deposited over the entire surface of the first substrate 301 including the gate line GL and the gate electrode GE. The gate insulating layer 311 may be deposited by a chemical vapor deposition (CVD) method.

The gate insulating layer 311 may include or be formed of a material included in the aforementioned gate insulating layer 311.

Subsequently, a semiconductor material and an impurity semiconductor material are sequentially deposited over the entire surface of the first substrate 301 including the gate insulating layer 311. The semiconductor material and the impurity semiconductor material may be deposited by a chemical vapor deposition (CVD) method.

The semiconductor material may include or be formed of a material included in the aforementioned semiconductor layer 321.

The impurity semiconductor material may include or be formed of a material included in the aforementioned first and second ohmic contact layers 321a and 321b.

Subsequently, the semiconductor material and the impurity semiconductor material are patterned through a photolithography process such that the semiconductor layer 321 overlapping the gate electrode GE is formed on the gate insulating layer 311 and a first impurity semiconductor pattern 841 is formed on the semiconductor layer 321 as illustrated in FIG. 5C.

The semiconductor material and the impurity semiconductor material may be removed by a dry-etching method using an etching gas.

Subsequently, a source metal layer is deposited over the entire surface of the first substrate 301 including the semiconductor layer 321 and the impurity semiconductor pattern 841.

The source metal layer may be manufactured using a material included in the aforementioned source electrode SE.

Subsequently, the source metal layer is patterned through a photolithography process such that the data line DL intersecting the gate line GL is formed on the gate insulating layer 311 and the source electrode SE and the drain electrode DE overlapping opposite sides of the semiconductor layer 321 are formed on the impurity semiconductor pattern 841 as illustrated in FIG. 5D.

Subsequently, in a state that the source electrode SE and the drain electrode DE are used as a mask, the impurity semiconductor pattern 841 is patterned through an etching process, and as illustrated in FIG. 5E, the first ohmic contact layer 321a and the second ohmic contact layer 321b are formed. The first ohmic contact layer 321a is formed between the source electrode SE and the semiconductor layer 321, and the second ohmic contact layer 321b is formed between the drain electrode DE and the semiconductor layer 321.

In an exemplary embodiment of the present invention, in the etching process performed on the aforementioned impurity semiconductor pattern 841, a portion of the semiconductor layer 321 below the impurity semiconductor pattern 841 is removed. Accordingly, a thickness of a portion of the semiconductor layer 321 corresponding to the channel area is reduced.

Subsequently, a photosensitive organic material is formed over the entire surface of the first substrate 301 including the switching element TFT and the gate insulating layer 311. Subsequently, a color conversion material is formed on the photosensitive organic material.

Subsequently, the photosensitive organic material and the color conversion material are patterned through a photolithography process such that the color filter 354 and the color conversion layer 195 are formed as illustrated in FIG. 5F. In an exemplary embodiment of the present invention, the red color filter, the green color filter, and the blue color filter are sequentially formed. Similarly, the red color conversion layer, the green color conversion layer, and the blue color conversion layer are sequentially formed. For example, a blue photosensitive organic material and a blue color conversion material are formed over the entire surface of the first substrate 301 including the switching element TFT and the gate insulating layer 311, and then the blue photosensitive organic material and the blue color conversion material are patterned through a first photolithography process such that a blue color filter 354 and a blue color conversion layer 195 are manufactured. Subsequently, a red photosensitive organic material and a red color conversion material are formed over the entire surface of the first substrate 301 including the blue color filter 354 and the blue color conversion layer 195, and then the red photosensitive organic material and the red color conversion material are patterned through a second photolithography process such that a red color filter 354' and a red color conversion layer 195' are manufactured. Subsequently, a green photosensitive organic material and a green color conversion material are formed over the entire surface of the first substrate 301 including the blue color filter 354, the blue color conversion layer 195, the red color filter 354', and the red color conversion layer 195', and then the green photosensitive organic material and the green color conversion material are patterned through a third photolithography process such that a green color filter 354" and a green color conversion layer 195" are manufactured.

In an exemplary embodiment of the present invention, when the backlight unit 444 emitting blue light is used, a light transmission layer may be used in lieu of the aforementioned blue color filter 354 and the blue color conversion layer 195. The light transmission layer may be manufactured using a transparent photosensitive material.

Subsequently, as illustrated in FIG. 5G, the capping layer 391 is deposited over the entire surface of the first substrate 301 including the color conversion layer 195, the switching element TFT, and the gate insulating layer 311.

The capping layer 391 may include a material substantially the same as that included in the aforementioned capping layer 391.

Subsequently, as illustrated in FIG. 5H, the planarization layer 356 is formed over the entire surface of the first substrate 301 including the capping layer 391.

Subsequently, the planarization layer 356 and the capping layer 391 are removed in a selective manner through a photolithography process, such that the first contact hole 951 is defined to expose the drain electrode DE as illustrated in FIG. 5I.

Subsequently, as illustrated in FIG. 5J, the polarization pattern 700 is formed on the planarization layer 356. The polarization pattern 700 may be transferred to the planarization layer 356 by a method of stamping or imprinting. The polarization pattern 700 overlaps the color conversion layer 195 and the switching element TFT. That is, as illustrated in FIG. 6, respective polarization patterns 700 of the pixels are formed on the planarization layer 356, being connected to one another.

Subsequently, as illustrated in FIG. 5K, the passivation layer 320 is formed over the entire surface of the first substrate 301 including the polarization pattern 700 and the planarization layer 356. The polarization lines 750 are spaced apart from each other at a significantly small gap measured in nanometers, and thus the passivation layer 320 is absent between adjacent ones of the polarization lines 750. The hole 909 defined by being surrounded by the polarization lines 750, the planarization layer 356, and the passivation layer 320 that are adjacent to one another may be filled with air.

Subsequently, as illustrated in FIG. 5L, a photoresist PR is formed on the passivation layer 320. The photoresist PR is coated over the entire surface of the first substrate 301 including the passivation layer 320.

Subsequently, a mask M is disposed above the photoresist PR. In an exemplary embodiment of the present invention, the mask M includes a transmissive area TA through which light is transmitted, a blocking area BA through which light is blocked, and a half-transmissive area HTA through which light is partially transmitted. The half-transmissive area HTA may include a plurality of slits or a half-transparent layer. In such an exemplary embodiment, a light transmittance of the half-transmissive area HTA is lower than a light transmittance of the transmissive area TA. For example, the light transmittance of the half-transmissive area HTA may be about ½ times the light transmittance of the transmissive area TA.

Subsequently, light such as ultraviolet light is selectively irradiated to the photoresist PR through the mask M such that the photoresist PR is exposed. When the exposed photoresist PR is developed, a first photoresist pattern PP1 and a second photoresist pattern PP2, having thicknesses different from each other, are formed on the passivation layer 320 as illustrated in FIG. 5M. The second photoresist pattern PP2 has a thickness smaller than a thickness of the first photoresist pattern PP1. For example, the thickness of the second photoresist pattern PP2 may be about ½ times the thickness of the first photoresist pattern PP1. In an exemplary embodiment of the present invention, the mask M illustrated in FIG. 5M is to facilitate the description of the position of the first and second photoresist patterns PP1 and PP2, and the mask M is removed before the developing process illustrated in FIG. 5M is performed.

The first photoresist pattern PP1 is disposed on the passivation layer 320 corresponding to the blocking area BA of the mask M for patterning, and the second photoresist pattern PP2 is disposed on the passivation layer 320 corresponding to the half-transmissive area HTA of the mask M. The second photoresist pattern PP2 is disposed corresponding to an area to be defined with the second contact hole 952.

Subsequently, in a state that the first and second photoresist patterns PP1 and PP2 are used as a mask, the passivation layer 320 is etched according to an exemplary embodiment of the present invention. In other words, a portion of the passivation layer 320 exposed by the first and second photoresist patterns PP1 and PP2 is etched. In such an exemplary embodiment, as illustrated in FIG. 5N, a portion of the passivation layer 320 disposed corresponding to the switching element TFT and a portion of the passivation layer 320 disposed corresponding to the gate line GL are removed. The passivation layer 320 is removed by a dry-etching method. As the portions of the passivation layer 320 are removed, a portion of the polarization lines 750 disposed corresponding to the switching element TFT and a portion of the polarization lines 750 disposed corresponding to the gate line GL are exposed.

Subsequently, as illustrated in FIG. 5O, an ashing process is performed. In an exemplary embodiment of the present invention, in the ashing process, a thickness of the first photoresist pattern PP1 and a thickness of the second photoresist pattern PP2 are reduced by substantially the same extent. In such an exemplary embodiment, the ashing process is performed until the second photoresist pattern PP2 having a relatively small thickness is removed. That is, when the second photoresist pattern PP2 is removed, the ashing process ends.

As the second photoresist pattern PP2 is removed, a portion of the passivation layer 320 below the second photoresist pattern PP2 is exposed. In an exemplary embodiment of the present invention, a portion of the first photoresist pattern PP1 is removed through the ashing process, and accordingly, a thickness of the first photoresist pattern PP1 is reduced. Hereinafter, the first photoresist pattern PP1 which remains after the ashing process is defined as a third photoresist pattern PP3.

Subsequently, in a state where the third photoresist pattern PP3 is used as a mask, the polarization pattern 700 is etched according to an exemplary embodiment of the present invention. In other words, a portion of the polarization pattern 700 exposed by the third photoresist pattern PP3 is etched. The polarization pattern 700 is removed in a wet-etching method. In such an exemplary embodiment, as illustrated in FIG. 5P, a portion of the polarization lines 750 disposed corresponding to the switching element TFT and a portion of the polarization lines 750 disposed corresponding to the gate line GL are removed. As the portions of the polarization pattern 700 are removed, a portion of the planarization layer 356 disposed corresponding to the switching element TFT and a portion of the planarization layer 356 disposed corresponding to the gate line GL are exposed. In addition, through the etching process performed on the polarization pattern 700, the polarization pattern 700 is separated for each pixel. That is, respective polarization patterns 700 in pixels that are adjacent to each other having the gate line GL therebetween are separated from each other.

Subsequently, in a state where the third photoresist pattern PP3 is used as a mask, the passivation layer 320 is etched according to an exemplary embodiment of the present invention. A portion of the passivation layer 320 exposed by the third photoresist pattern PP3 is etched. The passivation layer 320 is removed by a dry-etching method. In such an exemplary embodiment, as the passivation layer 320 is etched, the planarization layer 356 is also etched. That is, the passivation layer 320 and the planarization layer 356 are both removed through a dry-etching method. In such an exemplary embodiment, as illustrated in FIG. 5Q, the second contact hole 952 is defined in the passivation layer 320 and overlaps the polarization pattern 700. A portion of the polarization pattern 700 below the second contact hole 952 is exposed by the second contact hole 952. In addition, through the dry-etching, the first groove 981 and the second groove 982 are defined in the planarization layer 356. The first groove 981 is defined corresponding to the switching element TFT, and the second groove 982 is defined corresponding to the gate line GL. The first groove 981 is defined between the polarization pattern 700 of the current pixel and another polarization pattern of an adjacent pixel. Respective polarization patterns 700 in pixels that are adjacent to each other having the gate line GL therebetween are separated from each other by the second groove 982.

Subsequently, as illustrated in FIG. 5R, the third photoresist pattern PP3 is removed. The third photoresist pattern PP3 may be removed using a strip solution. The strip solution may include ethylene carbonate.

Subsequently, a transparent metal layer is deposited over the entire surface of the first substrate 301 including the passivation layer 320 and the planarization layer 356.

The transparent metal layer may include a material substantially the same as that included in the aforementioned pixel electrode PE.

Subsequently, the transparent metal layer is patterned through a photolithography process such that the pixel electrode PE is formed as illustrated in FIG. 5S. The pixel electrode PE is connected to the polarization pattern 700 through the second contact hole 952.

Subsequently, the light blocking layer 376 and the column spacer 472 are formed in the light blocking area. The light blocking layer 376 is disposed on a portion of the planarization layer 356, a portion of the passivation layer 320, and a portion of the pixel electrode PE in the light blocking area. The light blocking layer 376 and the column spacer 472 may be simultaneously provided, or alternatively, may be separately provided through different processes.

In an exemplary embodiment of the present invention, the light blocking layer 376 may be disposed on the first substrate 301 as described hereinabove, and the column spacer 472 may be disposed on the second substrate 302 rather than the first substrate 301. In such an exemplary embodiment, for example, the column spacer 472 may be disposed on the common electrode 330.

In an exemplary embodiment of the present invention, the light blocking layer 376 and the column spacer 472 may be disposed on the second substrate 302 rather than the first substrate 301. In such an exemplary embodiment, for example, the light blocking layer 376 may be disposed between the second substrate 302 and the common electrode 330, and the column spacer 472 may be disposed on the common electrode 330. In other words, the column spacer 472 may be disposed between the common electrode 330 and the first substrate 301.

In an exemplary embodiment of the present invention, the light blocking layer 376 may be disposed on the second substrate 302 rather than the first substrate 301, and the column spacer 472 may be disposed on the first substrate 301 as described hereinabove. In such an exemplary embodiment, for example, the light blocking layer 376 is disposed between the second substrate 302 and the common electrode 330.

Subsequently, a first alignment layer is formed on the light blocking layer 376, the column spacer 472, and the pixel electrode PE.

Subsequently, the common electrode 330 is formed on an inner wall of the second substrate 302. The common electrode 330 is disposed over an entire surface of the inner wall of the second substrate 302.

Subsequently, the second alignment layer is formed on the common electrode 330.

Subsequently, the liquid crystal layer 333 is formed between the first substrate 301 and the second substrate 302. The liquid crystal layer 333 is disposed between the first alignment layer of the first substrate 301 and the second alignment layer of the second substrate 302. The first substrate 301 and the second substrate 302 may be bonded to each other by a sealant.

Subsequently, the polarization plate 381 is formed on an outer surface of the second substrate 302.

Subsequently, the backlight unit 444 facing the polarization plate 381 is disposed below the second substrate 302.

Figure 7:
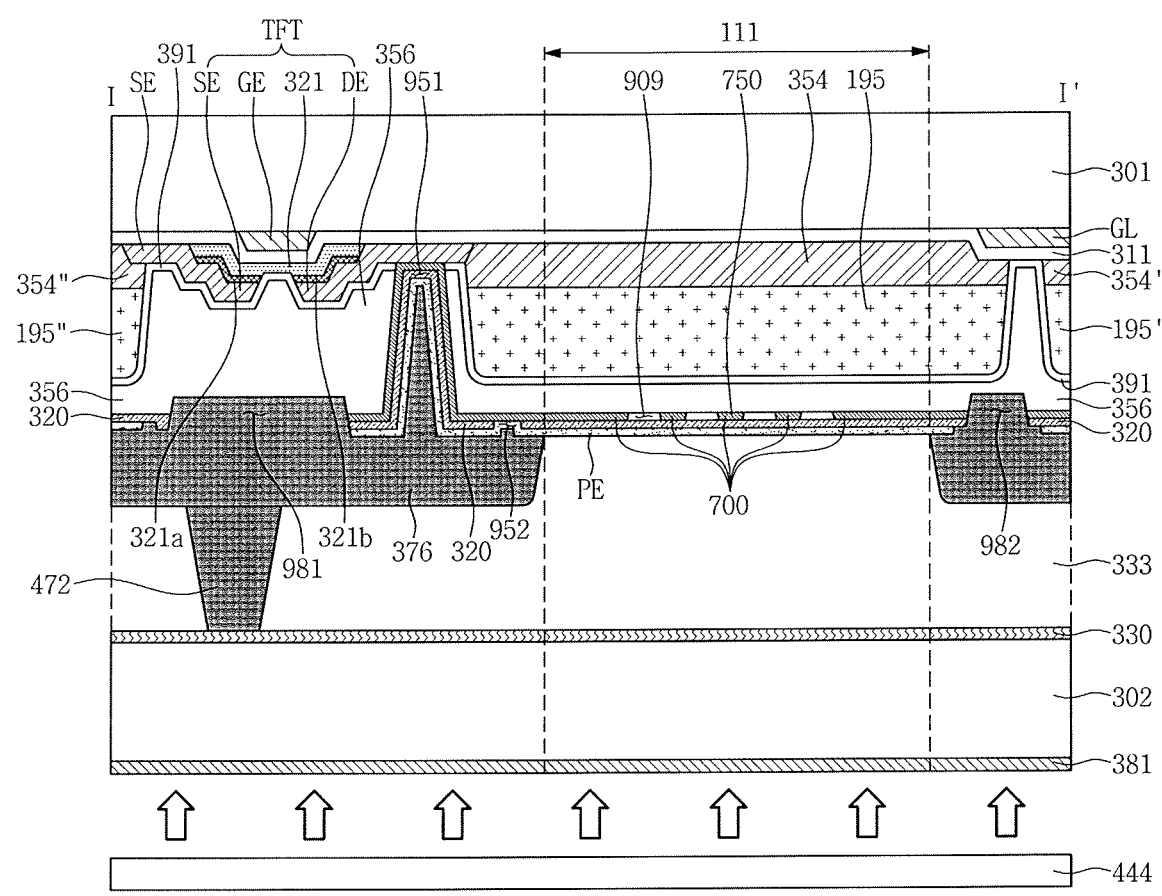
FIG. 7 is a cross-sectional view taken along line I-I' of FIG. 1.

FIG. 7 is a cross-sectional view taken along line I-P of FIG. 1.

As illustrated in FIG. 7, the light blocking layer 376 and the column spacer 472 may be provided by separate processes. That is, after the light blocking layer 376 is formed, the column spacer 472 maybe formed on the light blocking layer 376 through a separate process.

As set forth above, according to one or more exemplary embodiments of the present invention, a display device and a method of manufacturing the display device may provide the following effects.

First, a switching element, a color conversion layer, and a polarization pattern are disposed on substantially the same substrate, and thus arrangement condition of the switching element, the color conversion layer, and the polarization pattern may be excellent. Second, as the switching element, the color conversion layer, and the polarization pattern are disposed on substantially the same substrate, a distance between the pixel electrode and a data line may increase. Thus, coupling phenomenon between the pixel electrode and the data line may be prevented such that the pixel electrode may further extend onto the data line. Accordingly, an aperture ratio of a pixel may increase.

While the present invention has been shown and described with reference to the specific exemplary embodiments thereof, it will be apparent to those of ordinary skill in the art that various changes in form and detail may be made thereto without departing from the spirit and scope of the present invention.

What is claimed is:

1. A display device comprising:
   a first substrate comprising a light emission area and a light blocking area;
   a switching element and a color conversion layer on the first substrate;
   a polarization pattern overlapping the color conversion layer and connected to the switching element; and
   a pixel electrode overlapping the polarization pattern and connected only in the light blocking area to the polarization pattern.

2. The display device of claim 1, further comprising a color filter between the color conversion layer and the first substrate.

3. The display device of claim 2, further comprising a capping layer on the switching element and on at least one of the color filter and the color conversion layer.

4. The display device of claim 1, further comprising a planarization layer on the switching element and the color conversion layer.

5. The display device of claim 4, wherein the planarization layer is defined with:
   a first contact hole defined corresponding to a connecting portion between the switching element and the polarization pattern; and
   a groove defined between the polarization pattern and another polarization pattern.

6. The display device of claim 5, wherein a depth of the first contact hole is greater than a depth of the groove.

7. The display device of claim 5, further comprising a passivation layer between the polarization pattern and the pixel electrode.

8. The display device of claim 7, wherein the passivation layer is defined with:
   a second contact hole defined corresponding to the polarization pattern; and
   a hole defined corresponding to the groove.

9. The display device of claim 8, wherein the polarization pattern is connected to the switching element through the first contact hole, and
   the pixel electrode is connected to the polarization pattern through the second contact hole.

10. The display device of claim 7, wherein the polarization pattern comprises a plurality of polarization lines spaced apart from each other.

11. The display device of claim 10, wherein an air layer is disposed between adjacent ones of the polarization lines.

12. The display device of claim 10, wherein at least one of the plurality of polarization lines is connected to the switching element.

13. The display device of claim 1, further comprising:
   a second substrate; and
   a liquid crystal layer between the first substrate and the second substrate.

14. The display device of claim 13, wherein the switching element, the color conversion layer, the polarization pattern, and the pixel electrode are disposed between the first substrate and the liquid crystal layer.

15. The display device of claim 13, further comprising a polarization plate having a transmission axis that has a direction different from a direction of a transmission axis of the polarization pattern, wherein the second substrate is disposed between the liquid crystal layer and the polarization plate.

16. The display device of claim 1, further comprising a light blocking layer overlapping the switching element.

17. The display device of claim 16, further comprising a column spacer on the light blocking layer.

18. The display device of claim 17, wherein the light blocking layer and the column spacer are unitary.

19. A method of manufacturing a display device, the method comprising:
   forming a switching element on a first substrate;
   forming a color conversion layer on the first substrate;
   forming a planarization layer on the switching element and the color conversion layer;
   defining a first contact hole on the planarization layer, the first contact hole exposing a drain electrode of the switching element;
   forming a polarization pattern on the planarization layer, the polarization pattern connected to the drain electrode of the switching element through the first contact hole;
   forming a passivation layer on the polarization pattern;
   forming a first photoresist pattern and a second photoresist pattern on the passivation layer, the second photoresist pattern having a thickness smaller than a thickness of the first photoresist pattern;
   removing, through a dry-etching method, a first portion of the passivation layer exposed by the first photoresist pattern and the second photoresist pattern to expose a first portion of the polarization pattern;
   removing the second photoresist pattern to expose a second portion of the passivation layer and keeping a portion of the first photoresist pattern to form a residual photoresist pattern;
   removing, through a wet-etching method, the first portion of the polarization pattern exposed by the residual photoresist pattern to expose a first portion of the planarization layer;
   removing, through a dry-etching method, the second portion of the passivation layer exposed by the residual photoresist pattern to expose a second portion of the polarization pattern;
   removing the residual photoresist pattern; and
   forming a pixel electrode on the passivation layer, the pixel electrode connected to the second portion of the polarization pattern.

20. The method of claim 19, wherein a groove is further defined in the first portion of the planarization layer, through dry-etching in the removing of the second portion of the passivation layer to expose the second portion of the polarization pattern.

21. The method of claim 19, further comprising forming a color filter between the color conversion layer and the first substrate.

22. The method of claim 21, further comprising forming a capping layer on the switching element and on at least one of the color filter and the color conversion layer.

23. The method of claim 19, further comprising:
   forming a common electrode on one surface of a second substrate; and
   forming a liquid crystal layer between the first substrate and the second substrate.

24. The method of claim 23, further comprising:
   forming a polarization plate on another surface of the second substrate, the polarization plate having a transmission axis that has a direction different from a direction of a transmission axis of the polarization pattern; and
   disposing a backlight unit below the second substrate to face the polarization plate.

25. A display device comprising:
- a first substrate;
- a liquid crystal layer disposed between the first substrate and a second substrate;
- a switching element, a color conversion layer, a polarization pattern, and a pixel electrode disposed on the first substrate and interposed between the first substrate and the liquid crystal layer; and
- a common electrode disposed on the second substrate and interposed between the liquid crystal layer and the second substrate,
- wherein the pixel electrode is connected to the polarization pattern through a second contact hole.

26. The display device of claim 25, wherein the polarization pattern overlaps the color conversion layer and is connected to the switching element through a first contact hole, and the pixel electrode overlaps the polarization pattern.

27. The display device of claim 25, wherein the pixel electrode extends to overlap a data line.

28. The display device of claim 25, further comprising a color filter disposed between the color conversion layer and the first substrate.

* * * * *